United States Patent
Lysejko et al.

[11] Patent Number: 5,918,160
[45] Date of Patent: Jun. 29, 1999

[54] SUBSCRIBER TERMINAL FOR A WIRELESS TELECOMMUNICATIONS SYSTEM

[75] Inventors: Martin Lysejko, Bagshot; Richard M. Lamkin, East Molesey; Jonathan F. Nethercott, Guildford; Guy A. Cooper, Windsor, all of United Kingdom

[73] Assignee: Airspan Communications Corporation, Feltham, United Kingdom

[21] Appl. No.: 08/656,604

[22] Filed: May 31, 1996

[30] Foreign Application Priority Data

| Jun. 2, 1995 | [GB] | United Kingdom | 9510870 |
| Jun. 28, 1995 | [GB] | United Kingdom | 9513169 |
| Feb. 21, 1996 | [GB] | United Kingdom | 9603700 |

[51] Int. Cl.⁶ .............................. H04Q 7/32; H04Q 7/34
[52] U.S. Cl. ........................... 455/57; 455/425; 455/67.1
[58] Field of Search ........................ 455/67.4, 434, 455/515, 425, 423, 418, 419, 554, 456, 457, 557

[56] References Cited

U.S. PATENT DOCUMENTS

| 4,467,314 | 8/1984 | Weikel et al. | 340/310.02 |
| 4,890,315 | 12/1989 | Bendixen et al. | 379/59 |
| 5,113,706 | 5/1992 | Pittaro | 73/626 |
| 5,257,384 | 10/1993 | Farrand et al. | 395/725 |
| 5,630,224 | 5/1997 | Swail | 455/296 |
| 5,696,766 | 12/1997 | Yeoung et al. | 370/515 |
| 5,724,647 | 3/1998 | Sato | 455/54.1 |
| 5,765,113 | 6/1998 | Russo et al. | 455/557 |

FOREIGN PATENT DOCUMENTS

| 0373278 | 6/1990 | European Pat. Off. | G06F 1/00 |
| 0478942 | 4/1992 | European Pat. Off. | G06F 15/16 |
| 2253119 | 8/1992 | United Kingdom . | |
| 9220180 | 11/1992 | WIPO | H04L 29/02 |
| 9509512 | 4/1995 | WIPO . | |

OTHER PUBLICATIONS

Abbott, et al., "Increasing Network Throughput by Integrating Protocol Layers", IEEE 1993, No. 5, pp. 600–610.

*Primary Examiner*—Curtis A. Kuntz
*Assistant Examiner*—Alan Gantt
*Attorney, Agent, or Firm*—Baker & Botts, L.L.P.

[57] ABSTRACT

A subscriber station of a wireless telecommunications system includes a transmitter/receiver (24) for wireless communication with a central station and for processing signals for transmission and/or received signals. The transmitter/receiver (24) is connected via a link (408) to a supply unit (30) for connection to one or more telephone lines for user telecommunications equipment. The link (408) carries telephone call data for one or more telephone lines and subscriber station control data in accordance with an internal protocol. The internal protocol control data comprises operational status parameters of the subscriber station. The provision of internal protocol control data including operation status parameters on a link between the transmitter/receiver and the supply unit thus provides a point of access for monitoring the operational status of the subscriber station.

19 Claims, 16 Drawing Sheets

SUBSCRIBER TERMINAL FOR A WIRELESS TELECOMMUNICATIONS SYSTEM

TECHNICAL FIELD OF THE INVENTION

The present invention relates in general to telecommunications systems and more particularly to a subscriber terminal for a wireless telecommunications system.

BACKGROUND OF THE INVENTION

A wireless telecommunications system has been proposed with a central terminal, or station, at a central location in wireless communication with a plurality of subscriber terminals, or stations, at subscriber locations to implement a wireless telephony system. The system is intended to be used with fixed subscriber locations rather than the more familiar mobile cellular telephone systems.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

In the proposed system, the subscriber terminal is required to perform wireless transmission and reception tasks, signal coding and decoding tasks, initialisation and authentication tasks as well conventional telephony tasks. It will be appreciated that in order to ensure reliable communication with the central station, initial set-up procedures as well as on-going adjustment tasks are necessary.

Accordingly, it is desirable that diagnostic tools are available for verifying the status and operation of the subscriber unit. The present invention is, accordingly, directed to achieving this aim.

SUMMARY OF THE INVENTION

In accordance with the invention, therefore, there is provided a subscriber station of a wireless telecommunications system, which subscriber station comprises transmitter/receiver for wireless communication with a central station and a communications controller for processing signals for transmission and/or received signals, a supply unit for connection to one or more telephone lines for user telecommunications equipment and a link connecting the communications controller to the supply unit, wherein the link carries subscriber station control data in accordance with an internal protocol, the internal protocol comprises a first message type for passing control data between the communications controller and the supply unit and a second message type for passing control data to a subscriber terminal monitor system.

The provision of internal protocol control data including operation status parameters on a link between the communications controller and the supply unit thus provides a point of access for monitoring the operational status of the subscriber station. Moreover, the provision of separate message types allows a subscriber terminal monitor system to be connected to the link without impacting the operation of the link.

In the preferred embodiment of the invention, a multi-layer protocol is used, wherein a predetermined additional protocol layer is provided for assembling and disassembling messages of the second type.

Preferably, the communications controller comprises a protocol conversion structure having the predetermined layer and at least one lower protocol layer, wherein the lower protocol layer identifies messages of the second type and passes the messages of the second type to the predetermined layer for processing and bypasses the predetermined layer for messages of the first type.

Preferably, the predetermined protocol layer can be selectively switched in and out. Preferably also, the predetermined protocol layer is automatically switched out a predetermined time after being initialised.

Preferably, also, the supply unit comprises a protocol conversion structure without the predetermined layer, a lower layer preventing messages of the second type being passed to the supply unit.

Preferably, the communications controller and/or the supply unit comprise one or more registers for control data. These registers thus maintain the current status of parameters which can be monitored.

Preferably also, the communications controller and/or the supply unit comprise an interface for transmitting control data over the link. The interface(s) assemble(s) the parameters into messages which are then transmitted over the link in accordance with the link protocol.

In the preferred embodiment the interface transmits control data over the link via an RS232 interface. The link is preferably a multi-wire cable.

In the preferred embodiment of the subscriber station the transmitter/receiver, including an aerial arrangement, and the communications controller are contained in a common housing configured for mounting at a raised location for wireless communication with a remote central station. The supply unit is preferably an alternating current power supply unit and is connected to the communications controller via a drop cable, which forms the link.

In the preferred embodiment of the invention, the control status parameters include one or more of the following:
- the status of a wireless uplink from the subscriber station to a central station;
- the status of a wireless downlink from the subscriber station to a central station;
- uplink power control level;
- downlink automatic gain control settings;
- downlink transmission rate;
- downlink error rate;
- software status codes; and
- subscriber station alarm status.

Preferably, the control status parameters also include one or more of the following:
- subscriber station wireless transmission and reception codes;
- subscriber station equipment identifiers; and
- subscriber station serial numbers.

Also, the status parameters preferably include an installation enable status code.

BRIEF DESCRIPTION OF THE DRAWINGS

An embodiment of the invention will be described hereinafter, by way of example only, with reference to the accompanying drawings in which like reference signs are used for like features and in which.

DETAILED DESCRIPTION OF THE INVENTION

Figure 1:
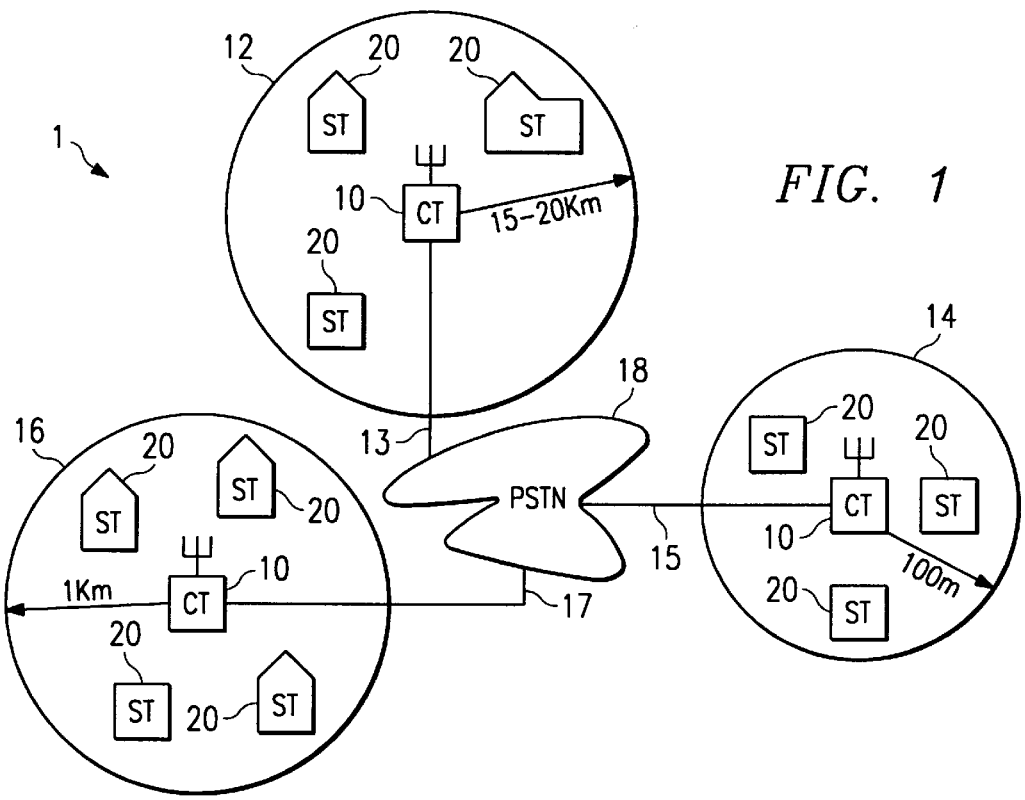
FIG. 1 is a schematic overview of an example of a wireless telecommunications system.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc., and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
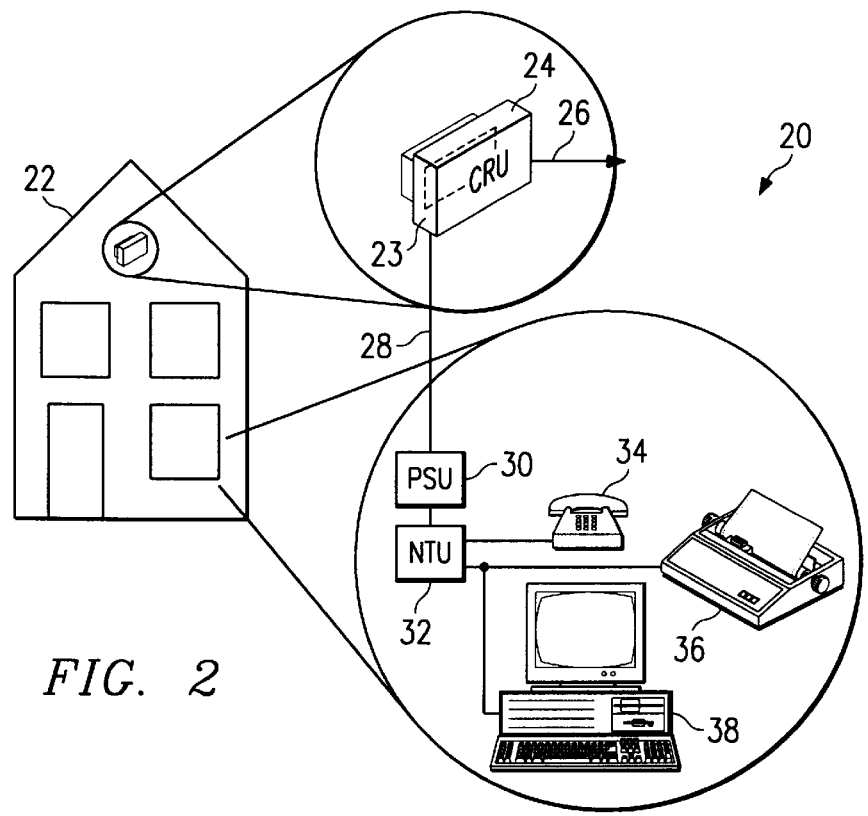
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 bits/sec or digital communications in accordance with the ISDN BRA standard.

Figure 3:
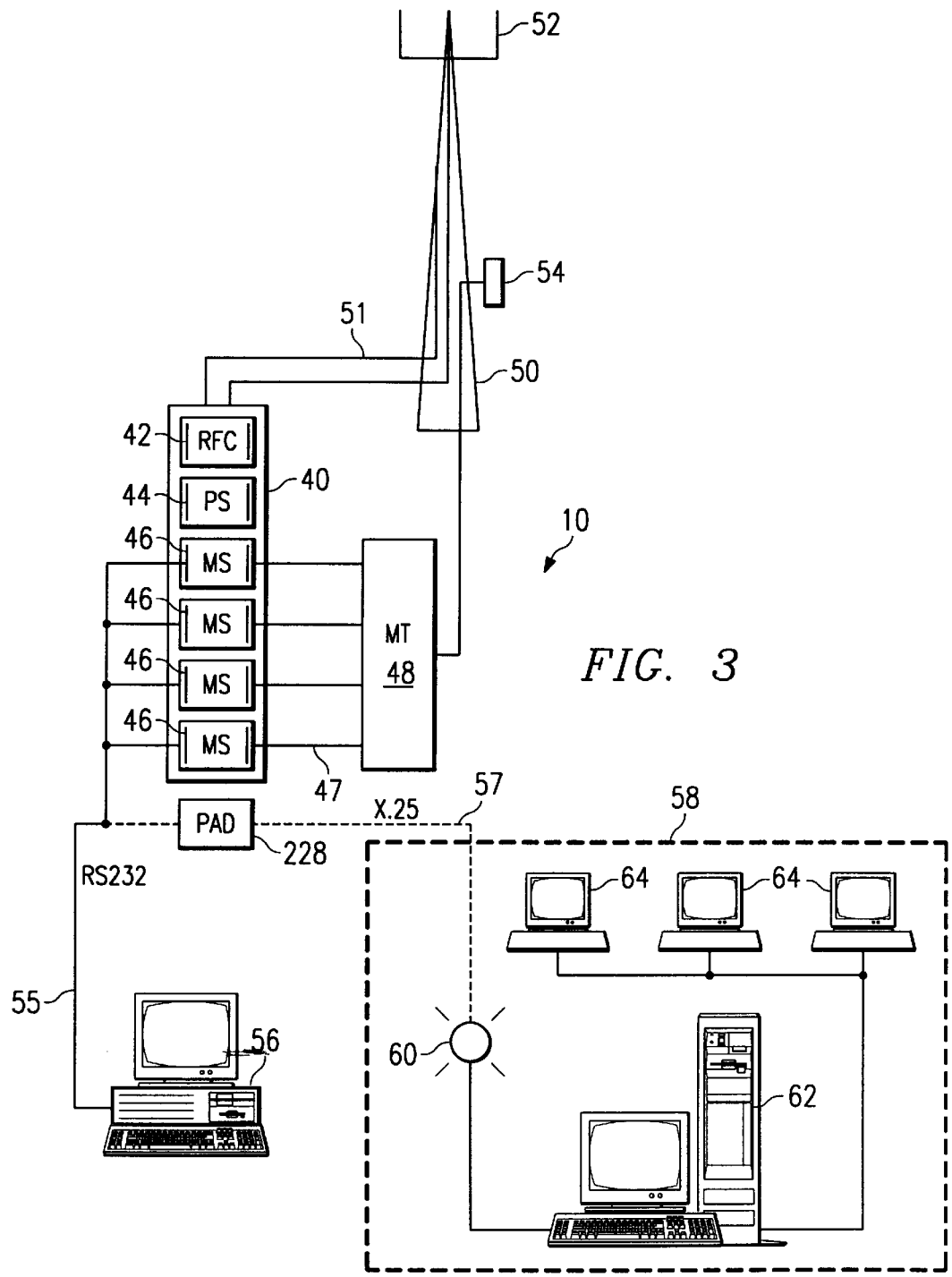
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
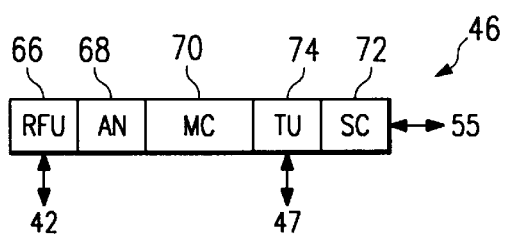
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and×16 spreading with CDMA codes on the transmit signals, and synchronisation recovery, de-spreading and error correction on the receive signals. Each modem card 70 in the present example has two modems, each modem supporting one subscriber link (or two lines) to a subscriber terminal 20.

Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
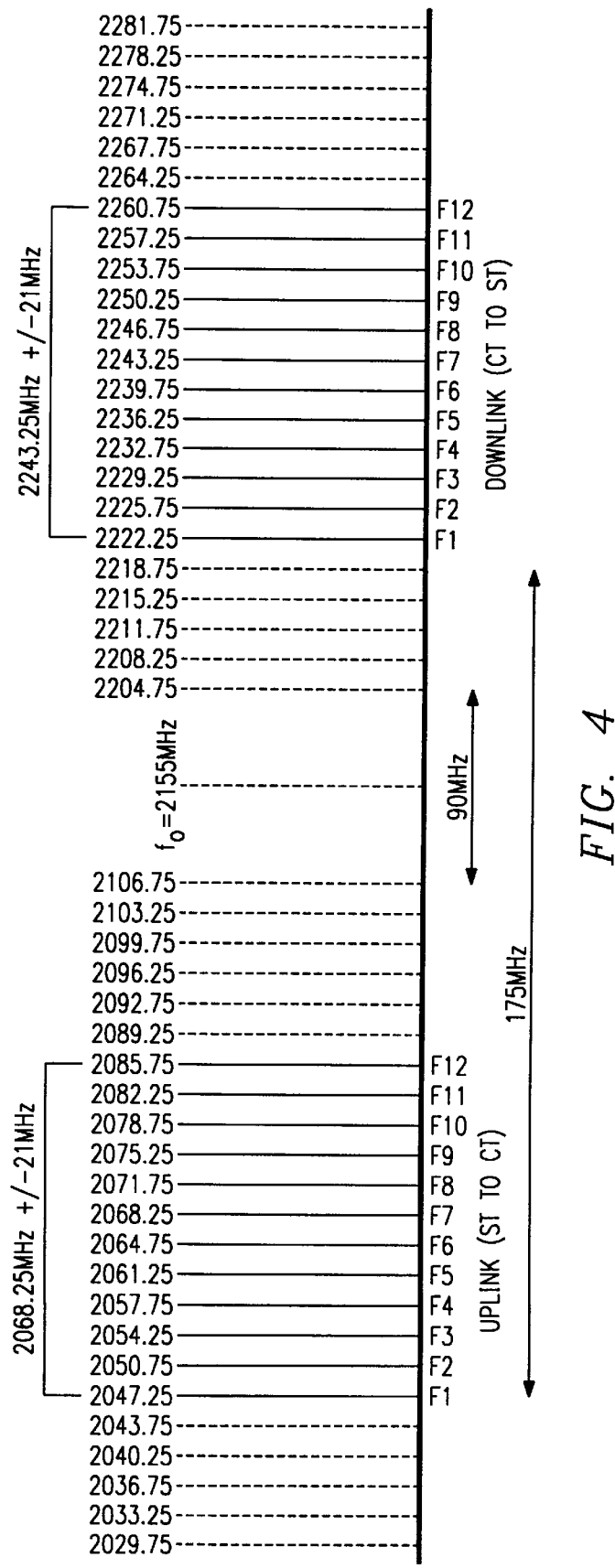
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
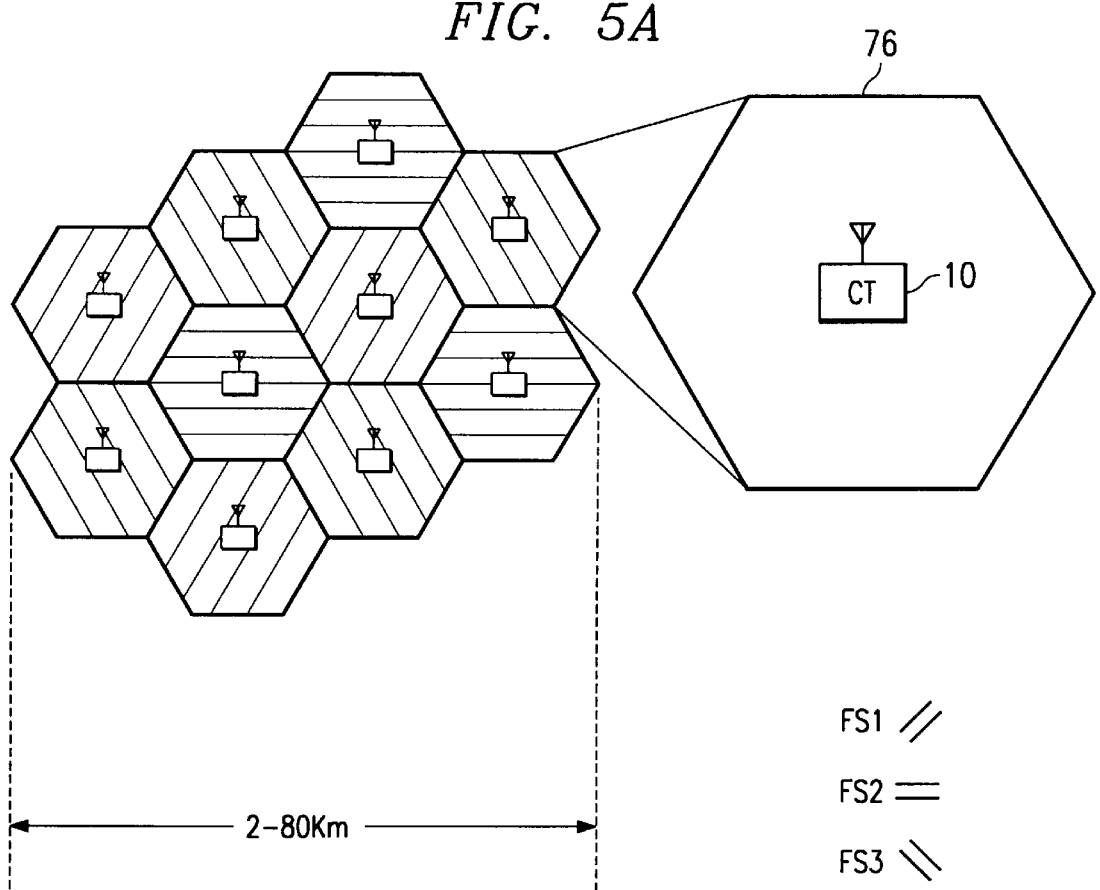
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
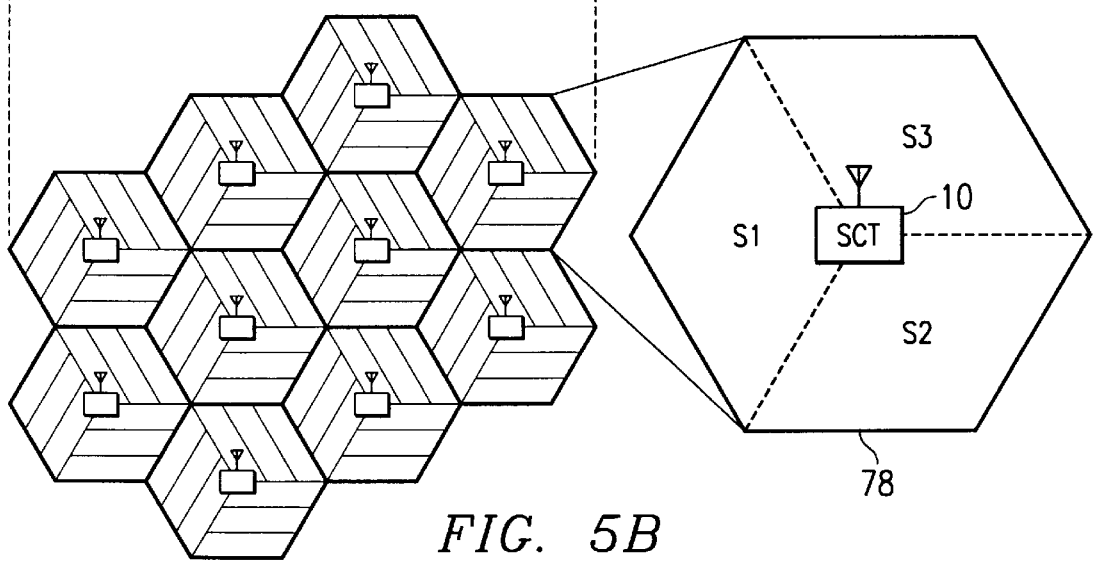

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12) . However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
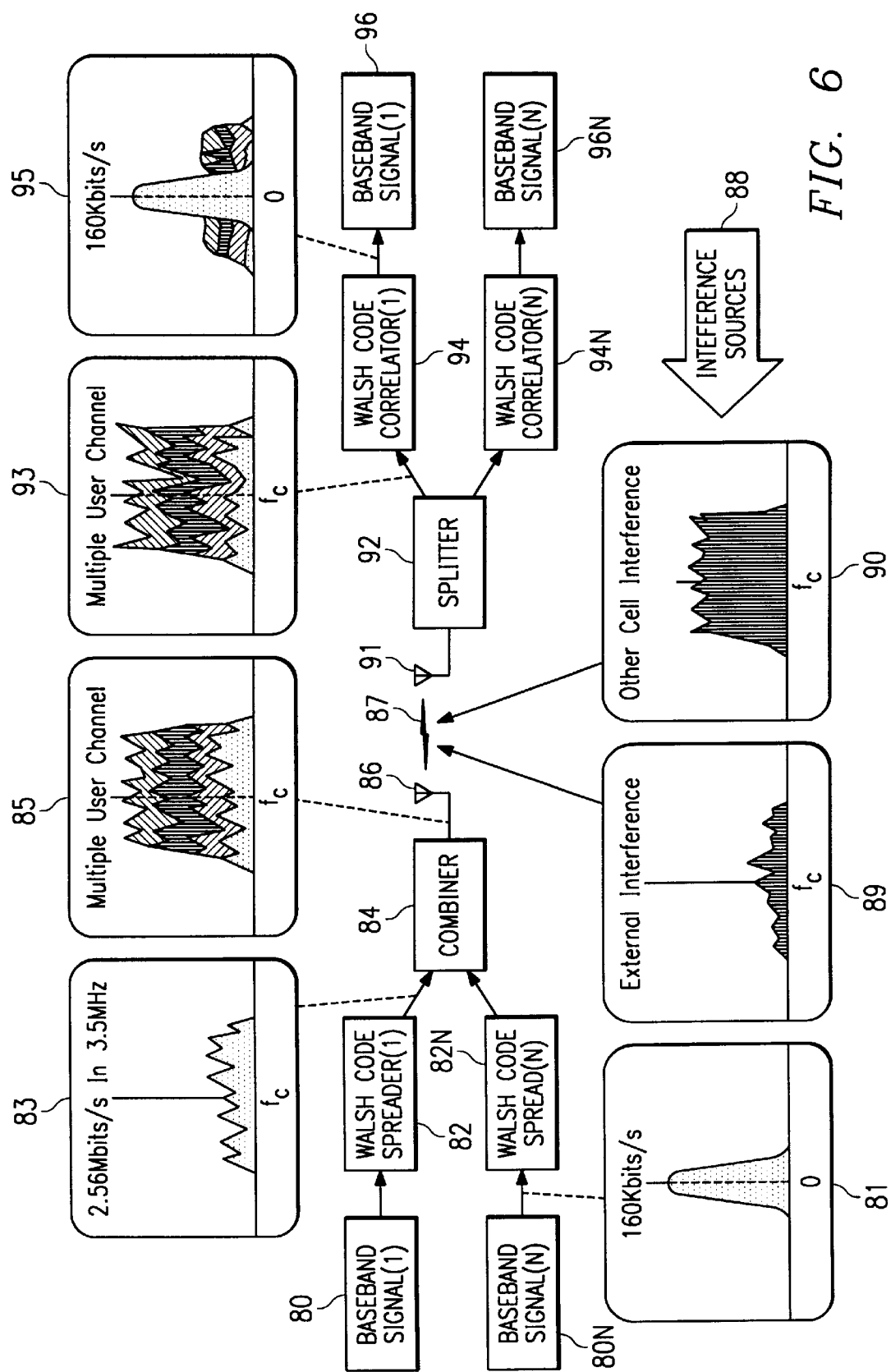
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80 N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same pseudo random noise (PN) code that was used for the encoding for each subscriber link to extract a signal (e.g., as represented at 95) for the respective received baseband signal 96–96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
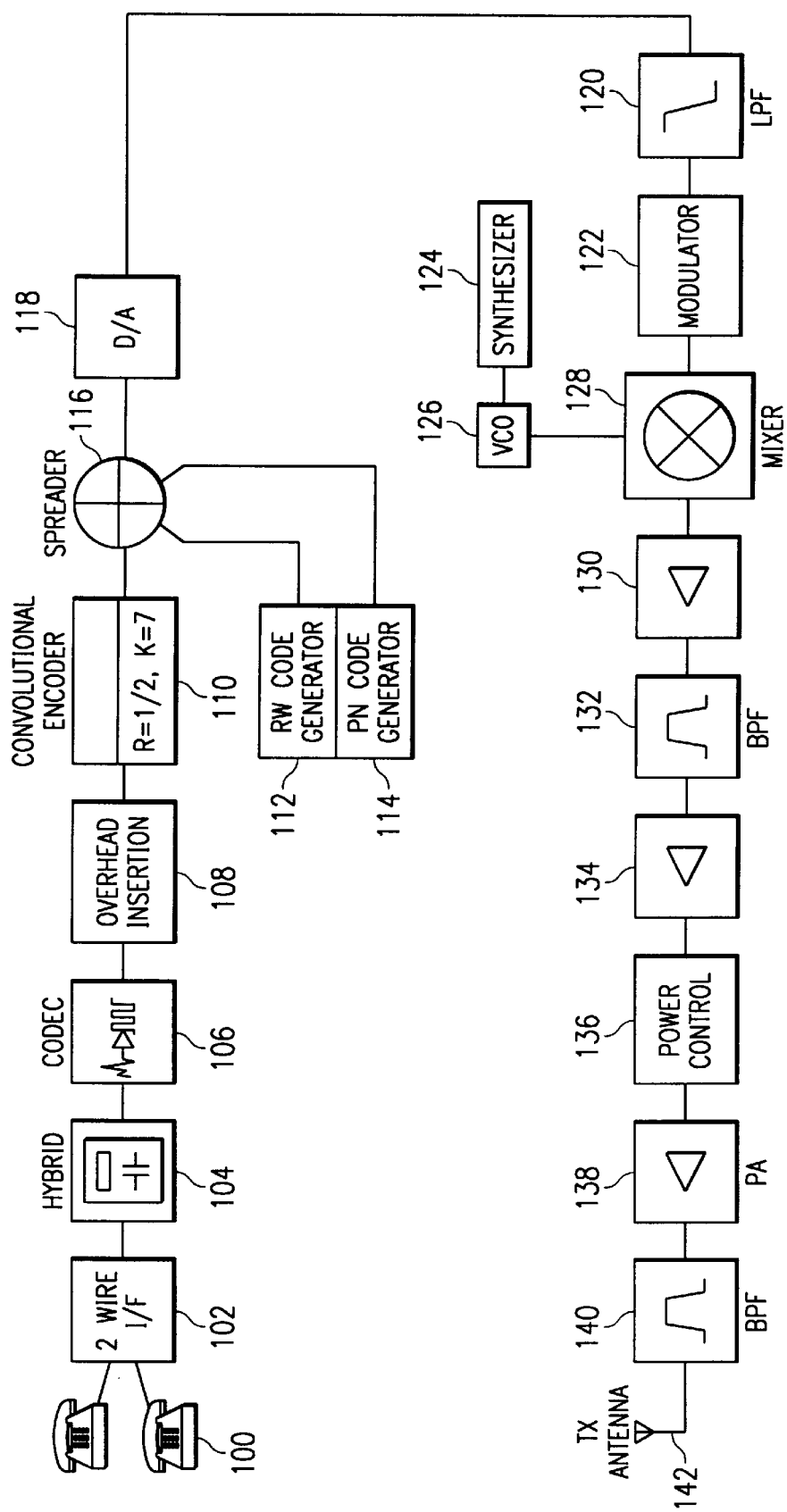
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
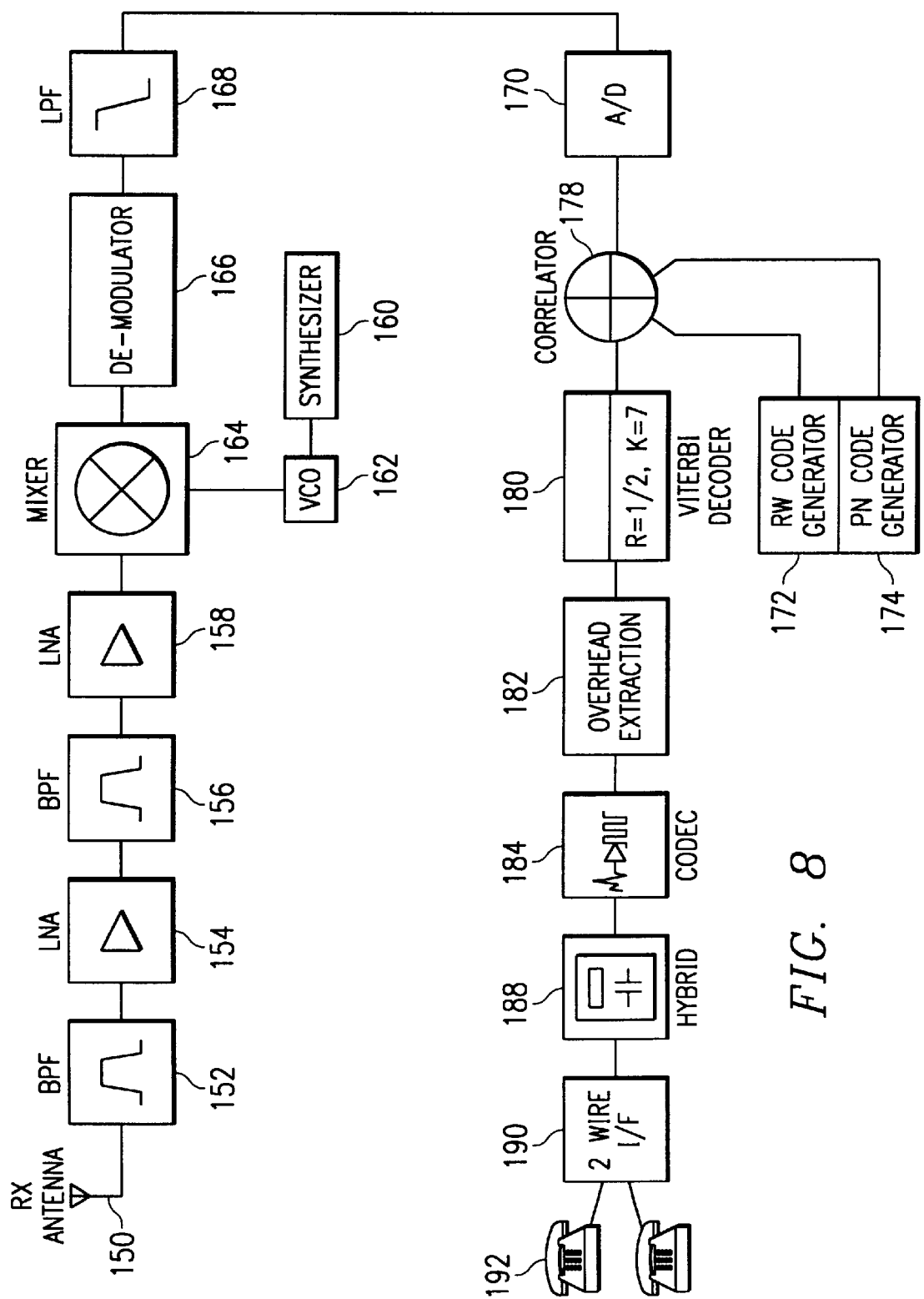
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator.

Figure 9:
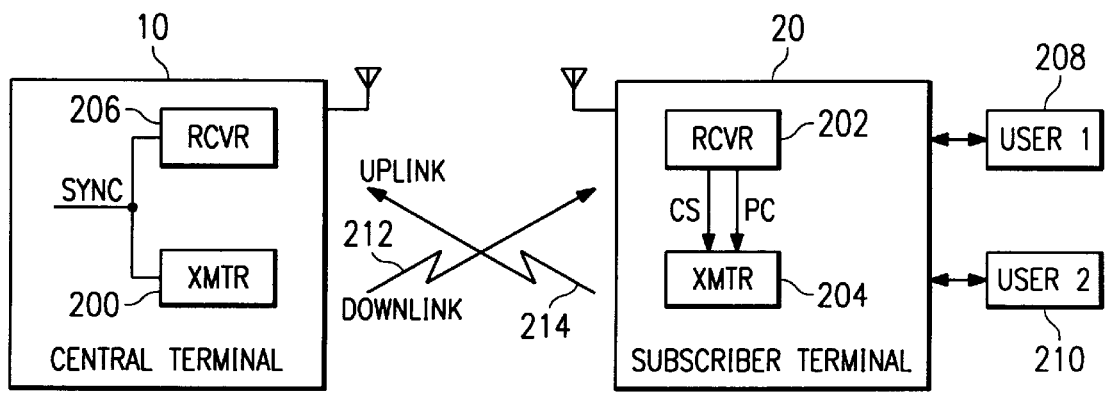
FIG. 9 is a schematic diagram illustrating downlink and uplink communication paths for the wireless telecommunications system.

FIG. 9 is a block diagram of downlink and uplink communication paths between the central terminal 10 and the subscriber terminal 20. A downlink communication path is established from the transmitter 200 in the central terminal 10 to the receiver 202 in the subscriber terminal 20. An uplink communication path is established from the transmitter 204 in the subscriber terminal 20 to the receiver 206 in the central terminal 10. Once the downlink and the uplink communication paths have been established in the wireless telecommunication system 1, telephone communication may occur between a first user 208 or a second user 210 of the subscriber terminal 20 and a user serviced through the central terminal 10 over a downlink signal 212 and an uplink signal 214. The downlink signal 212 is transmitted by the transmitter 200 of the central terminal 10 and received by the receiver 202 of the subscriber terminal 20. The uplink signal 214 is transmitted by the transmitter 204 of the subscriber terminal 20 and received by the receiver 206 of the central terminal 10. The downlink signal 212 and uplink signal 214 are transmitted as CDMA spread spectrum signals.

Figure 10:
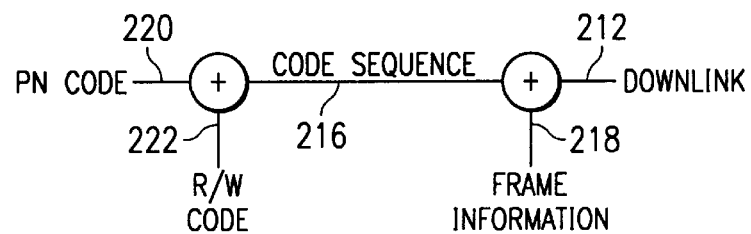
FIG. 10 is a schematic diagram illustrating a downlink signal transmitted by the central terminal.

The receiver 206 and the transmitter 200 within the central terminal 10 are synchronized to each other with respect to time and phase, and aligned as to information boundaries. In order to establish the downlink communication path, the receiver 202 in the subscriber terminal 20 should be synchronized to the transmitter 200 in the central terminal 10. Synchronization occurs by performing an acquisition mode function and a tracking mode function on the downlink signal 212. Initially, the transmitter 200 of the central terminal 10 transmits the downlink signal 212. FIG. 10 shows the contents of the downlink signal 212. The downlink signal 212 includes a code sequence signal 216 for the central terminal 10 combined with a frame information signal 218. The code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operate off of the same pseudo-random noise code signal as the central terminal 10. Each modem shelf 46 in the central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as the downlink signal 212 transmitted by the central terminal 10 and destined for the specific subscriber terminal 20.

The downlink signal 212 is received at the receiver 202 of the subscriber terminal 20. The receiver 202 compares its phase and code sequence to a phase and code sequence within the code sequence signal 216 of the downlink signal 212. The central terminal 10 is considered to have a master code sequence and subscriber terminal 20 is considered to have a slave code sequence. The receiver 202 incrementally adjusts the phase of its slave code sequence to recognize a match to master code sequence and place the receiver 202 of the subscriber terminal 20 in phase with the transmitter 200 of the central terminal 10. The slave code sequence of the receiver 202 is not initially synchronized to the master code sequence of the transmitter 200 and the central terminal 10 due to the path delay between the central terminal 10 and the subscriber terminal 20. This path delay is caused by the geographical separation between the subscriber terminal 20 and the central terminal 10 and other environmental and technical factors affecting wireless transmission.

When the downlink and the uplink communication paths are acquired, the wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between the central terminal 10 and the subscriber terminal 20 over the overhead channel 224.

When either an incoming or outgoing call is detected, a message is sent from the originating terminal to the destination terminal indicating that the downlink and uplink communication paths are required for the transmission of user traffic information. At this point, the wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronisation and frame alignment tracking is performed in both the standby mode and the traffic mode.

Figure 11:
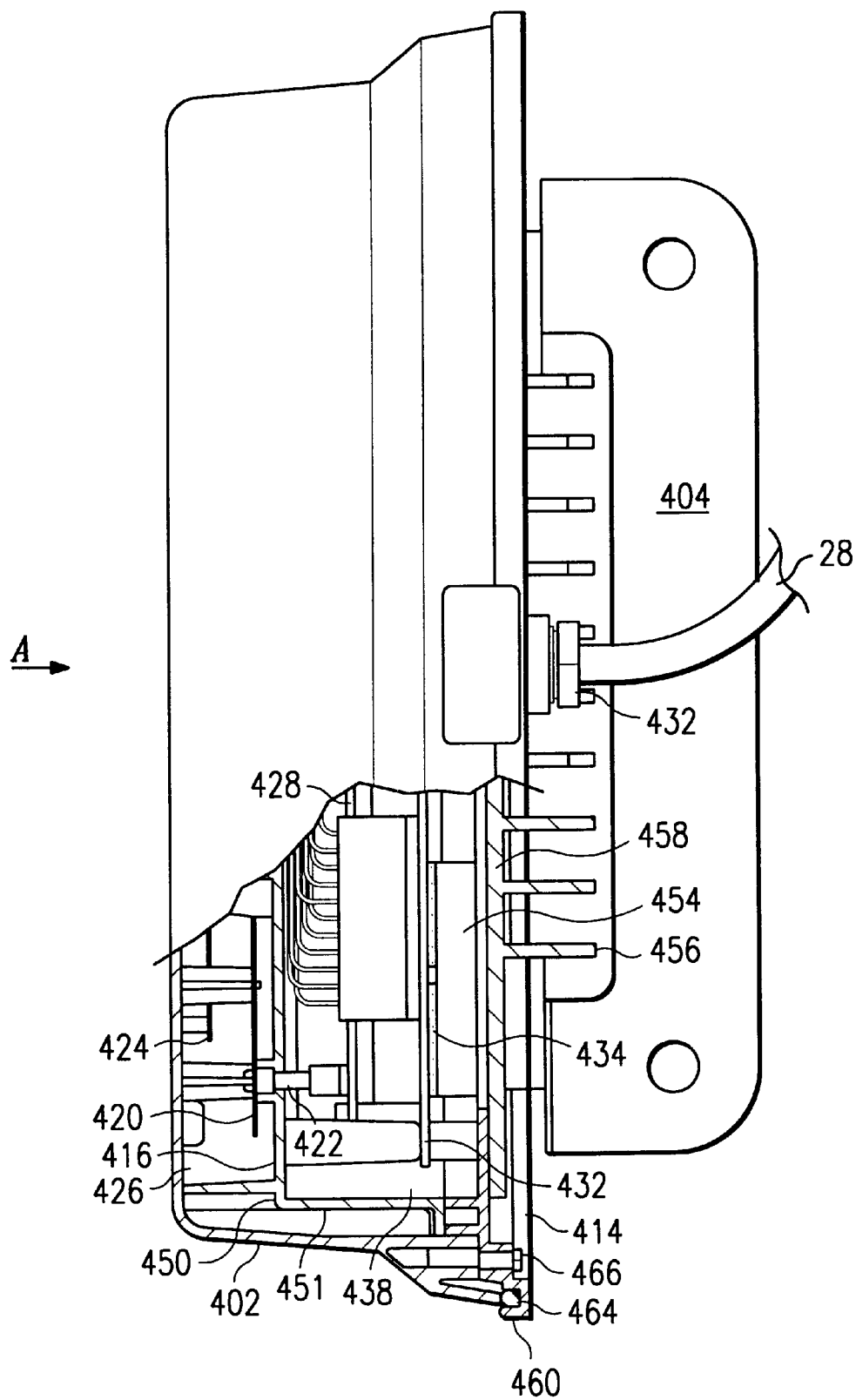
FIG. 11 is a schematic diagram, partially in cross-section of part of a subscriber terminal.

FIG. 11 is a schematic top view, partially in section of an example of an integrated antenna forming the customer radio unit (CRU) of FIG. 1.

FIG. 11 illustrates a chassis member 450 located within a radome 402. A vertically extending wall 416 of the chassis defines a rear wall for first and second resonant cavities 426 defined to the front of the wall 416. Part of one resonant cavity 426, which is located in the right hand portion of the antenna (the lower portion of FIG. 11) when viewed from the front (arrow A) is shown in FIG. 11. The other resonant cavity (not shown) is located in the left hand portion of the antenna (the upper portion of FIG. 11) when viewed from the front (arrow A). A wall (not shown) extends vertically (perpendicularly to the plane of FIG. 11) and forwardly (i.e. to the left in FIG. 11) from the wall 416 to separate the first and second dished resonant cavities 416.

The chassis member is preferably made of the same plastics material as the radome, although other plastics or other materials could be used. The forwardly facing surface of the vertically extending wall 416, the inwardly facing surfaces of the peripheral wall 419 and both sides of the horizontally extending wall 417 are preferably metallised, for example with a deposited layer of aluminium or an aluminium alloy for reflecting radio waves to define the resonant cavities.

Part of the radome 402 is cut away in the lower part of the Figure to show part of a microstrip radiator element 420 and patch re-radiator (reflector) 424. A stud 422 extends from the microstrip 420 and through the wall 416 to couple radio energy though the wall 416.

The chassis member 450 also has a rearwardly extending peripheral wall 451 for defining a rear cavity 438 for containing electronic components on one or more printed circuit boards. In FIG. 11, an RF board 428 having radio frequency circuitry 430 is provided which, when inserted in cavity 438, cooperates with the stud 422 on the microstrip 420. Also shown is a modem board 432 having modem circuitry for processing received signals from and for providing transmission signals to the RF circuitry 430. The modem circuitry 434 is then connected via a drop cable 28 which passes through a gland 435 in the rear cover 414 to the power supply unit 30 shown in FIG. 2.

The rear side of the wall 416 and the insides of the peripheral wall 451, as well as the inside of the rear cover 414, can be metallised to provide electromagnetic shielding for the electronic components in the rear cavity 438.

In this embodiment, the rear cover 414 has a peripheral portion 460 of plastics material and a central portion 458 formed of aluminium alloy with integral fins 456 to form an integral heat sink. The provision of a heat sink enables heat to be dissipated from electronic components sealed within the integrated antenna units. A bracket 404 is secured to the heatsink by screws 464 (see FIG. 14) although it could be formed integrally withe the aluminium portion 458 of the rear cover. An 'O'-ring seal 464 seals the rear cover 460 to the radome when the cover is secured thereto by screws 466. The aluminium portion 458 can be screwed at locations 466 to the peripheral plastics portion and sealed using conventional silicon sealant materials. The inside of the plastics portion 460 of the cover preferably has an aluminium coating to reduce electromagnetic interference.

In an alternative embodiment, the whole of the rear cover could be made of metal, for example, a cast aluminium alloy including the heat sink fins 456 and possibly the bracket 404.

To increase the heat transfer from the electronic components to the heatsink, the heatsink can be provided with internal pedestals 454 for contacting the circuits, or the circuit boards, directly. Alternatively, or in addition, heat conductive foam 452 can be used to couple the heat from the electronic components to the heat sink. This is particularly advantageous where a lot of heat is generated from the electronic components or when the antenna is used in warm environments, in order to avoid overheating of the components within the sealed unit.

Figure 12:
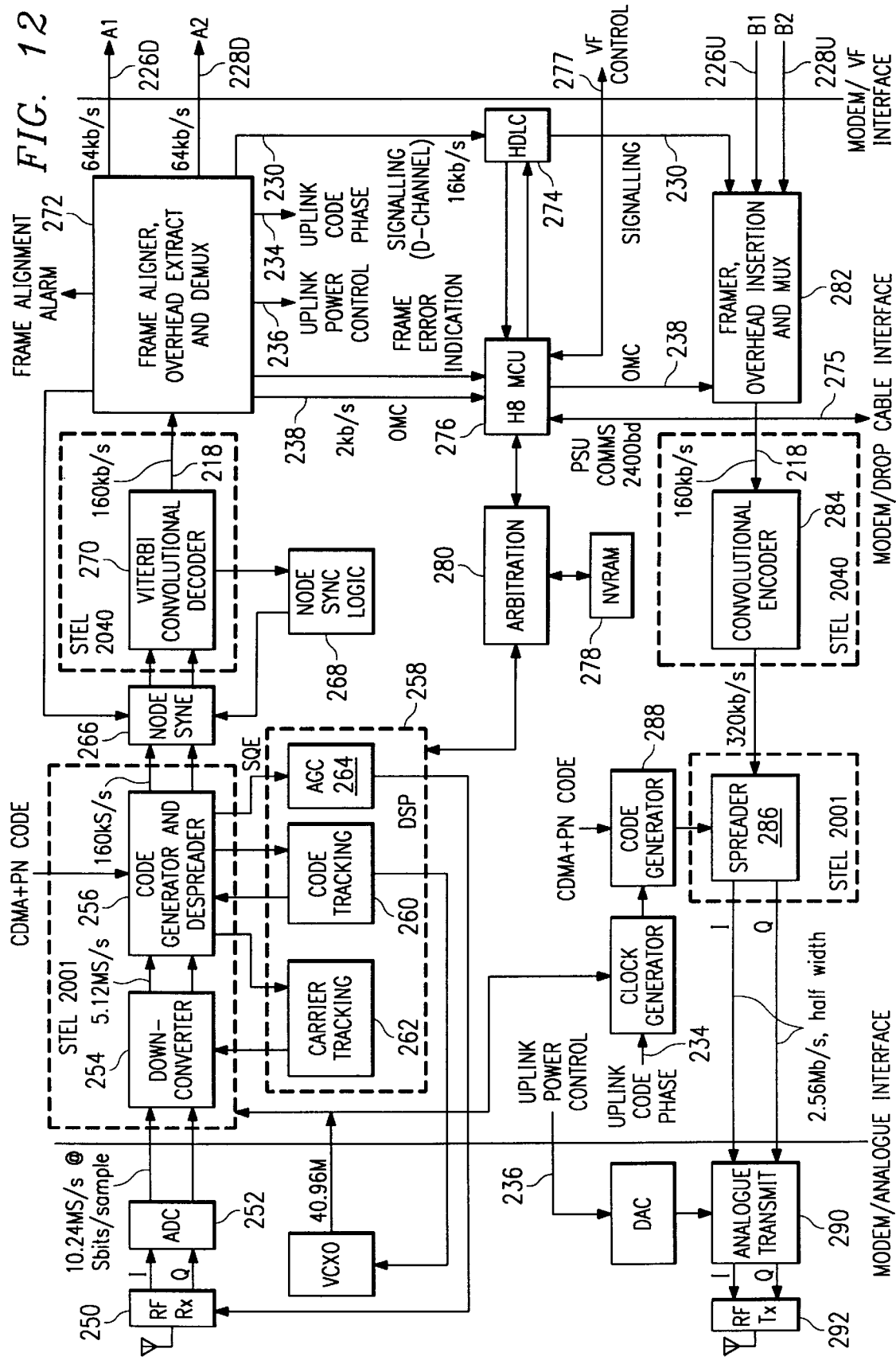
FIG. 12 is a schematic diagram of a communications controller of a subscriber terminal.

FIG. 12 is a detailed block diagram of a communications controller including the receiver 202 and transmitter 204 in a subscriber terminal 20. The receiver 202 receives the downlink signal 212 at an RF receive interface 250. The RF receive interface 250 separates the spread spectrum signal into I and Q signal components. The RF receive interface 250 band pass filters each of the I and Q signal components by removing portions above approximately half of the receiver 202 bandwidth of 3.5 MegaHertz. The RF receive interface 250 low pass filters the I and Q signal components to reject image frequencies and prevent signal aliasing. The I and Q signal components are placed into digital format by an analog to digital converter 252. The sampling frequency of the analog to digital converter 252 is four times the chip period, or 10.24 MegaHertz, with an eight bit resolution.

Within the communications controller, the digital I and Q signal components are stepped to a rate of 5.12 MegaHertz by a down converter 254. A code generator and despreader 256 performs synchronization acquisition and tracking functions to synchronize the phase of the Rademacher-Walsh and pseudo-random noise code sequence of the receiver 202 to that of the downlink signal 212. A digital signal processor 258 controls the phase of the slave code sequence through a code tracker 260 and a carrier tracker 262. An automatic gain control unit 264 produces an automatic gain control signal to control the gain of RF receive interface 250. The code generator and despreader 256 generates the I and Q 160 kilobits per second of frame information for further synchronization by a node sync interface 266 under the control of a node sync logic unit 268. The node sync interface 266, through the node sync logic unit 268, determines whether the I and Q channels should be swapped, as they may be received in four different ways.

The Viterbi decoder 270 provides forward error correction on the I and Q channels and generates an error corrected 160 kilobits per second data signal after a 71 symbol delay. The error corrected signal is processed by a frame aligner and the extractor 272 determines frame alignment and extracts a power control signal 236, code synchronization 234, and an operations and maintenance channel signal 238. The frame aligner and extractor 272 also extracts a first user channel 226 and a second user channel 228 for traffic transmission towards a first user 208 and a second user 210, and a signalling channel 230 for processing by high level data link controller 274 and a microcontroller 276. The frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. The arbitrator 280 also provides an interface between the digital signal processor 258 and the microcontroller 276.

In the transmit direction, a frame inserter 282 receives first user traffic and second user traffic from the first user 208 and the second user 210, signalling channel 230 information from the high level data link controller 274, and operations and maintenance channel 238 information from the microcontroller 276. Frame inserter generates the frame information signal 218 for uplink signal 214 for processing by a convolutional encoder 284. The convolutional encoder 284 doubles the data rate of the frame information signal 218 to provide forward error correction. A spreader 286 splits the 320 kilobits per second signal of the convolutional encoder 284 into two 160 kilobits per second I and Q signals and exclusively ORs these signals with the spreading sequence generated by a code generator 288 in response to a system clock generated by the clock generator 290 as adjusted by the code synchronization signal 234. The code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

The spreader 286 of the communications controller supplies the I and Q signals to an analog transmitter 290. The analog transmitter 290 produces pulsed I and Q signals for an RF transmit interface 292. Transmit power is generated by first establishing a control voltage from a digital to analog converter in response to the power control signal 236 extracted from the overhead channel 224. This control voltage is applied to the power control inputs of analog transmitter 290 and RF transmit interface 292. Power control of 35 decibels is obtainable in both the analog transmitter 290 and the RF transmit interface 292. The RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

Figure 13:
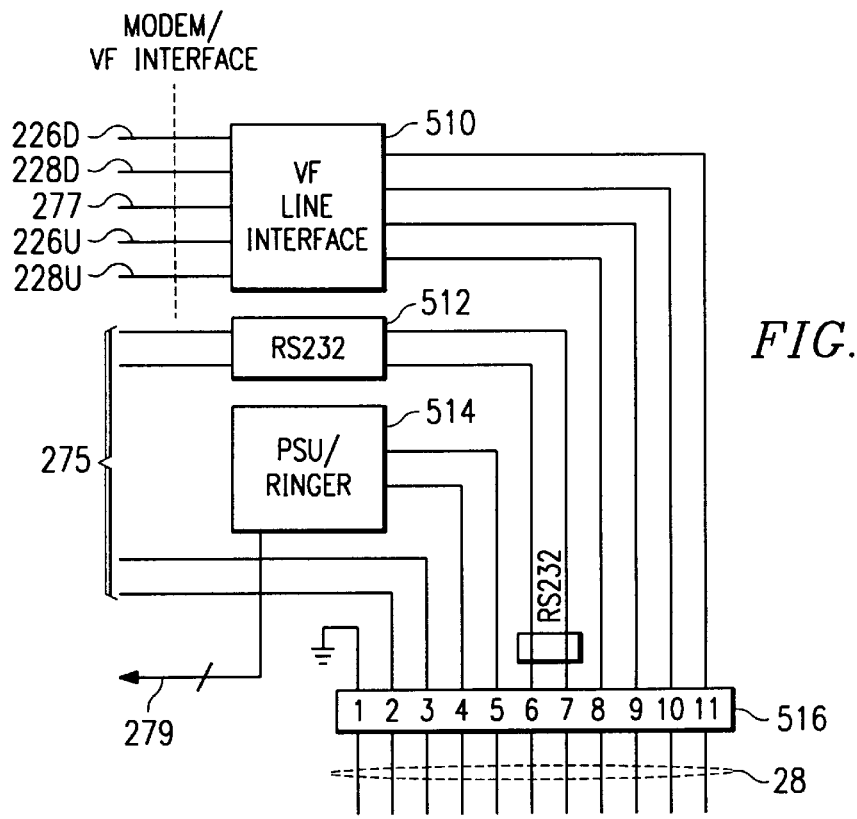
FIG. 13 is a schematic diagram of a drop cable interface from the communications controller.

FIG. 13 is a schematic overview of the VF line interface and drop cable interface which enables the communications controller including the modem circuitry illustrated in FIG. 12 to be connected to the drop cable.

Specifically, a VF line interface 510 is connected to receive the downlink connections 226D and 228D from the frame aligner, as well as VF control lines 277 from the microcontroller 276. The VF line interface also is connected via lines 226U and 228U to the framer, overhead insertion and multiplexer unit 282. The VF line interface is further connected to terminals 8, 9, 10 and 11 of a terminal block 516. The lines to terminals 8 and 9 are the first and second wires of the first subscriber telephone line 1 and the wires to terminals 10 and 11 are the first and second wires of the second subscriber telephone line 2.

Also shown in FIG. 13 is a representation 512 of an RS232 line interface from the cable interface shown in FIG. 12 from the microcontroller 276. The first and second lines of the RS232 512 are connected to terminals 6 and 7 of the terminal block 516. One of the control lines 275 from the microcontroller 276 is a receiver automatic gain control monitor line which is connected to terminal 2 of the terminal block 516. Another of the control lines in the cable interface 275 from the microcontroller 276 is a transmit power control indicator line and this is connected to terminal 3 of the terminal block 516. These are both analogue signal lines and are used at the power supply unit during installation of the subscriber terminal so that the engineer can verify correct installation using a meter at the power supply unit. Positive and negative battery connections are connected from terminals 4 and 5 of the terminal block 516 to a power supply unit/ringer unit 514, which in turn is connected by power supply lines 279 to the communications controller and transmit/receiver of FIG. 12 (the power supply lines not being shown in FIG. 12). Terminal 1 is an earth connection. The eleven terminals are connected to respective wires of the drop cable, with the screen of the cable being connected to terminal 1.

Figure 14:
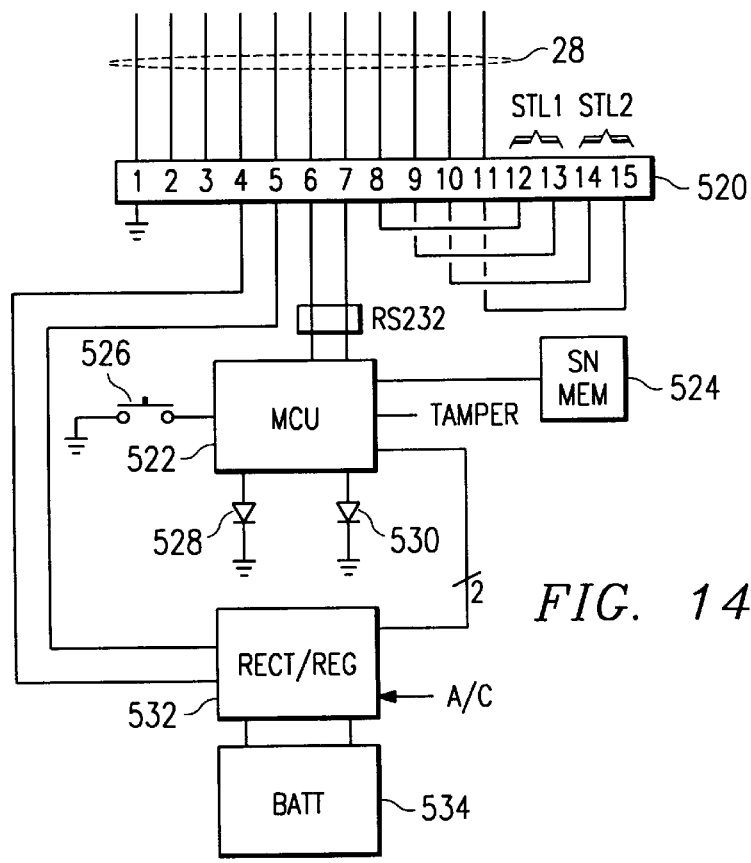
FIG. 14 is a schematic diagram of a power supply unit of a subscriber terminal including a drop cable interface.

FIG. 14 is a schematic diagram of the power supply unit 30. Eleven terminals in a terminal block 520 are connected to the wires of the drop cable, with terminal 1 being connected to the screen of the cable. Terminal 1 is earthed.

Terminals 2 and 3 terminate at the terminal block and are used during installation of the subscriber unit as described above for verifying correct installation using a meter.

Terminals 4 and 5 are linked to a rectifier/regulator 532 which takes power from A/C mains. The rectifier/regulator also includes a battery charge/switch-over control for a backup battery 534, which is switched in when the mains supply fails.

Lines 6 and 7, which form the down and up RS232 control lines are connected to a microcontroller unit 522. The microcontroller 522 is connected to a memory which contains the power supply serial number. The microcontroller 522 is connected to the rectifier/regulator 532 to monitor the mains and battery status. The microcontroller is connected to a magnetic proximity switch which is linked to the cover of the power supply unit 30 and serves to indicate attempts to tamper with the power supply unit. The microcontroller is connected to a radio link status LED 528 which it controls in three different modes, e.g. off/on/flashing to indicate the status link OK/link failed/link not configured. The microcontroller is connected to a CRU status LED 530 which it controls in three different modes, e.g. off/on/flashing to indicate the status CRU OK/CRU failed/CRU initialising. The particular choice of modes to status can of course be selected as desired. The microcontroller is further connected to an install switch 526, activation of which causes the microcontroller to issue a message over the RS232 line to place the customer radio unit in an install mode, whereby installation information may be input to configure the subscriber unit using a telephone connected to one of the subscriber lines.

The terminals 8 to 11 for the subscriber lines are connected by respective jumpers to a set of four terminals for connection of two pairs of wires for the subscriber telephone lines 1 and 2.

Figure 15:
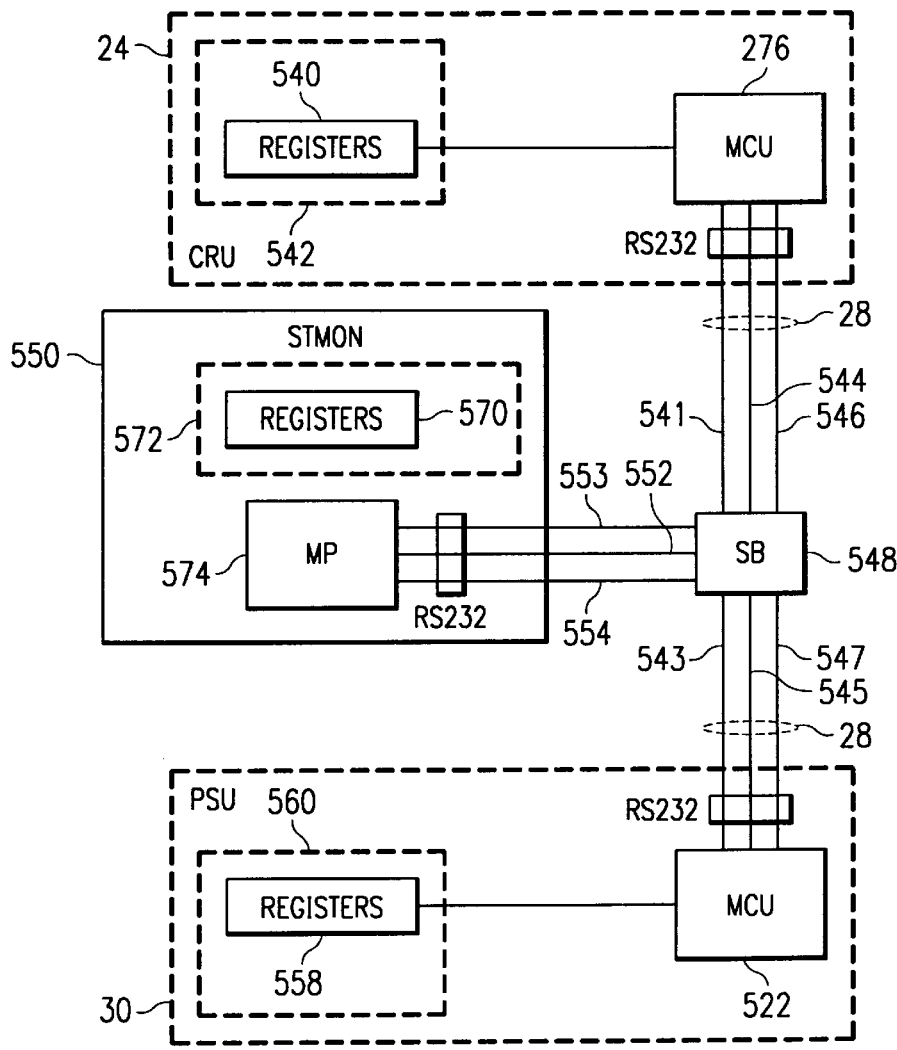
FIG. 15 is an overview of the link between the transmitter/receiver and the power supply unit and also illustrates a subscriber terminal monitor system.

FIG. 15 is a schematic representation of the connection of a subscriber terminal monitor (STMON) 550 to the RS232 lines 544/545 and 546/547 of the drop cable 28 by means of a switch box (SB) 548. In FIG. 15, only those wires in the drop cable 28 which are relevant to the connection of the subscriber terminal monitor 550 are shown, namely the screen cable 541/543 and the RS232 lines 544/545 and 546/547. The connection by means of the switch box 548 can be achieved in various ways.

For example, in one mode of operation switch box 548 can be arranged to switch out the RS232 lines 545 and 547 to the power supply unit 30. In this mode of operation, for example, the subscriber terminal monitor 550 simulates the power supply unit insofar as the generation of and response to messages over the RS232 link is concerned.

In another mode of operation, the switch box 548 allows the RS232 lines to the subscriber terminal monitor 550 to tap into the RS232 lines 545 and 547. In this mode, for example, the subscriber terminal monitor 550 can simply be used to monitor the traffic on the RS232 lines 544, 545 and 546, 547.

In either case, the switch box also permits the connection of the screen 533 for the wires 552 and 554 to be connected to the screen 543 of the drop cable.

FIG. 15 also illustrates sets of registers 540 and 556 in the customer radio unit 24 and the PSU 30, respectively. The sets of registers are used to hold current control parameters for transmission over the RS232 link. As shown the sets of registers 540 and 558 are shown to be in memories 542 and 560, respectively. Alternatively, the register sets 540 and 558 could be configured in the microcontrollers 276 and 522, respectively, or in separate processors. A similar set of registers 570 is provided in the subscriber terminal monitor 550. The set of registers 570 is shown to be in a memory 572 in the subscriber terminal monitor 550, although they could alternatively be implemented in a microprocessor 574 in the subscriber terminal monitor, or in a separate processor.

In the customer radio unit 24, the microcontroller 276 monitors various system parameters and stores parameter values in the registers 540. The microcontroller 276 assembles messages and transmits these to the microcontroller 522 in the PSU 30 via the RS232 line 544, 545.

In the PSU 30, the microcontroller 522 receives and processes the messages. The microcontroller 522 also assembles messages and transmits these to the microcontroller 276 in the customer radio unit 24 via the RS232 line 546, 547.

The system parameters which are stored in the registers 540 are as follows:

Uplink radio status (No link, OK)*

Uplink power control level

Downlink radio status (No link, OK)*

Downlink AGC level

Downlink rate (High or Low rate)

Downlink soft error count as a per second count

Subscriber terminal internal software state code

Subscriber terminal alarm (initialising, faulty)*

Subscriber terminal build status

Subscriber terminal channel code (RF, PN and R/W codes)

Subscriber terminal microcontroller software version number

Subscriber terminal modem interface serial number

Subscriber terminal identifier code

Of the above parameters, those marked with an asterisk, namely the uplink radio status, the downlink radio status and the subscriber terminal alarm are also maintained in the registers 558 in the PSU in the present embodiment.

It will be appreciated that in other embodiments, the full set of parameters could be maintained both in the register sets 540 and 558 and be updated in both units on a continual basis to cross-check for consistency. However, it will be appreciated that other selections of data could be stored in the register sets 540 and 558 to avoid duplication. Alternatively, one or other of the register sets 540 and 558 could be omitted, all required parameters being stored in the single remaining register set.

By systematically storing the above referenced parameters, and making them available on the RS232 link 544–547, it is possible to readily to analyze the operation of the subscriber terminal.

Also, by permitting modification of at least selected parameters, it is possible to control the operation of the subscriber terminal, for example in a test mode of operation.

The switch box 548 could be provided part way along the drop cable 28, although it is preferably configured by means of a connector within the housing of the PSU 30. The switch box can be provided with any suitable form of connector, for example a standard D connector or a stereo jack socket. In each case a three wire connection for ground 541/543 and the downlink communication path 544/545 and uplink communication path 546/547 of the RS232 connection is provided.

Figure 16:
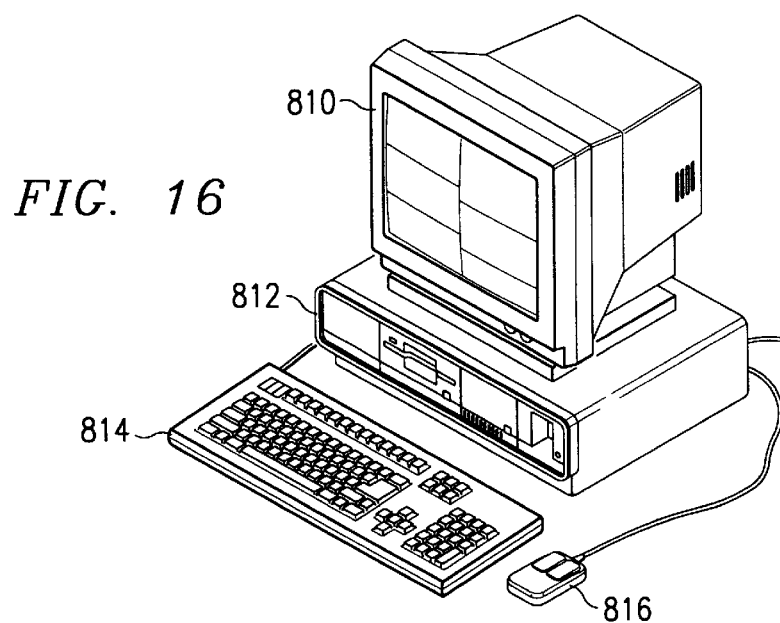
FIG. 16 is an illustration of an implementation of the subscriber terminal monitor system of FIG. 16.

FIG. 16 is a schematic diagram of a personal computer or workstation implementation of the subscriber terminal monitor system 420 including a display 810, a system unit 812 (which includes a processor, e.g. the microprocessor 574 represented in FIG. 15, and memory 572 represented in FIG. 15 as well as the other components of a conventional personal computer or workstation) and user input devices, here a keyboard 814 and a mouse 816. In the present embodiment the subscriber terminal monitor system is implemented by suitably programming the personal computer, although it will be appreciated that other implementations, for example using, at least in part, special purpose hardware configurations, and/or other user input devices, could be employed. The display is illustrated with various different fields to be described later.

In the preferred embodiment, the subscriber terminal monitor system is implemented on a personal computer running MS-DOS and communicates with the subscriber terminal via an RS232 interface 422 to the junction box 418. The following specification is recommended for the current implementation of the subscriber terminal monitor system: MS-DOS V5.0 or higher; 200 k free memory; one free COM port at 2400 baud; and up to 2 MByte free hard disk space for logging.

Figure 17:
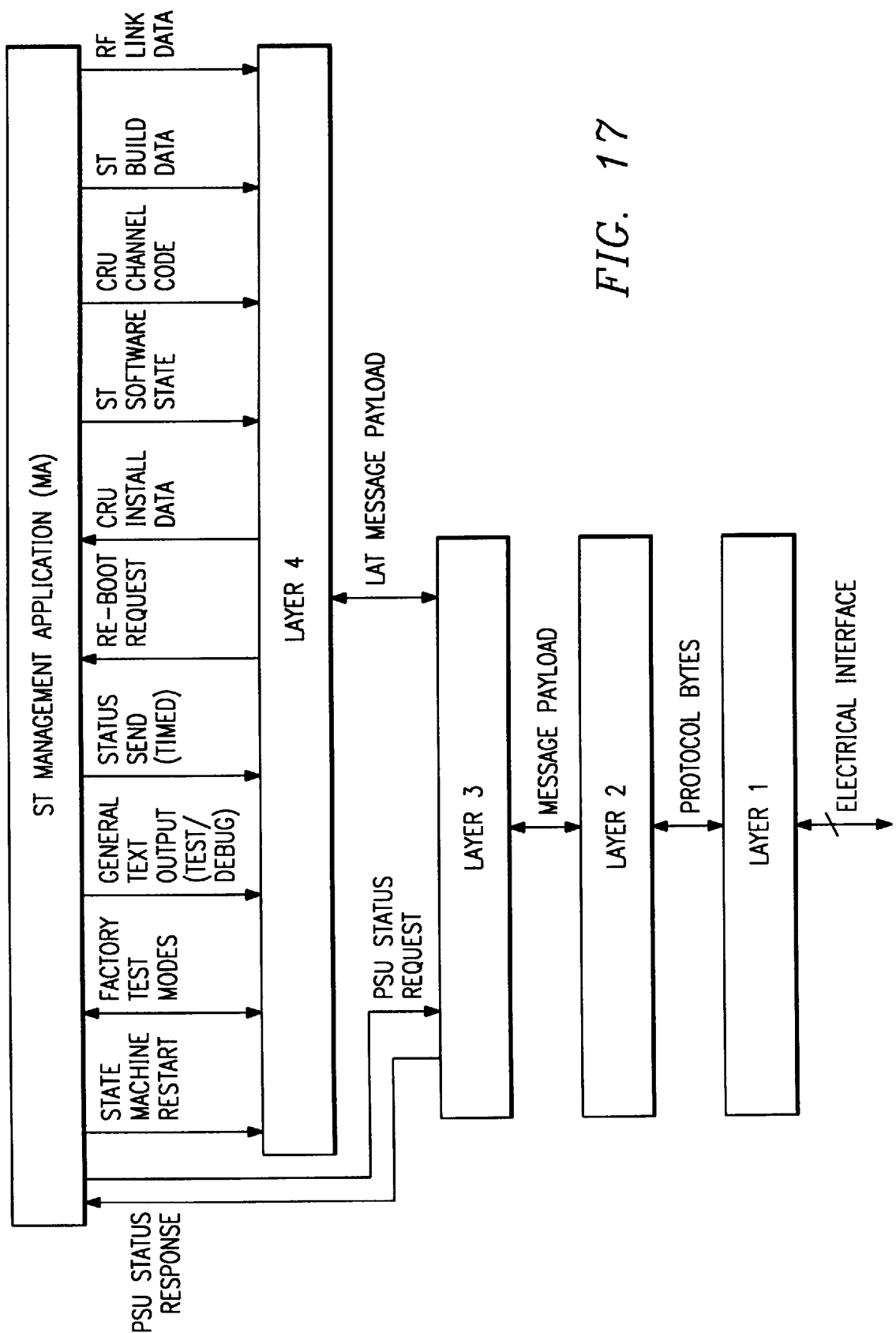
FIG. 17 illustrates a message protocol structure for the communications controller.

FIG. 17 illustrates the communication protocol as implemented on the microcontroller 276 of the customer radio unit 24 for communicating via the RS232 lines 544–547. It will be noted that the subscriber terminal management application implemented on the microcontroller 276 of the customer radio unit 24 communicates with the RS232 link either via three protocol layers 1 to 3 or via four protocol layers 1 to 4. The basic PSU status requests and responses pass via the three protocol layers and the other messages also pass via the fourth protocol layer. The fourth protocol layer provides for the generation messages particularly intended for communication with the subscriber terminal monitor 550. Selected individual messages are illustrated in FIG. 17. The individual protocol layers will be described in more detail below.

Figure 18:
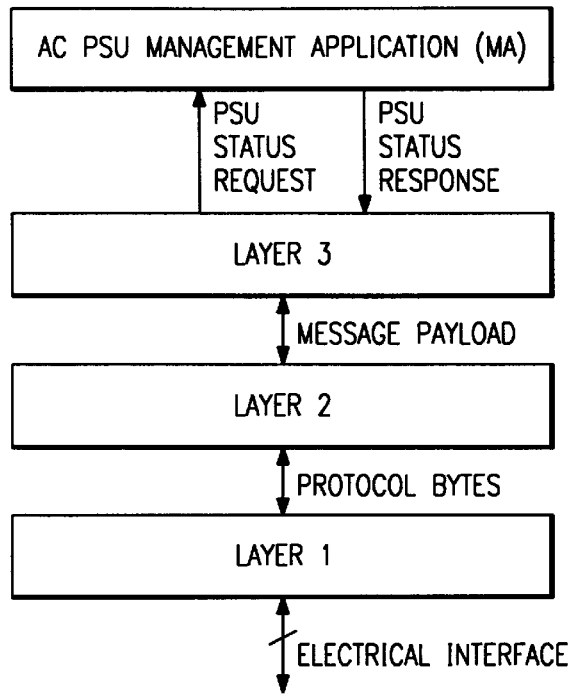
FIG. 18 illustrates a message protocol structure for the power supply unit.

FIG. 18 illustrates the communication protocol as implemented on the microcontroller 522 of the PSU 30 for communicating via the RS232 lines 544–547. It will be noted that the PSU management application implemented on the microcontroller 522 of the PSU 30 communicates with the RS232 link via three protocol layers 1 to 3 only. This is because the PSU is not configured for direct communication with the subscriber terminal monitor 550. Accordingly, the only messages which are passed from layer 3 to the PSU management application relate to PSU status request messages. Layer 4-type messages (i.e. for communication with the subscriber terminal monitor 550) are blocked, or ignored by layer 3. The only messages passed from the PSU management application to the layer 3 protocol relate to PSU status response messages, although it should be understood that the PSU management application will initiate it own "alarm response" messages without having first received a request message when a status parameter changes.

Figure 19:
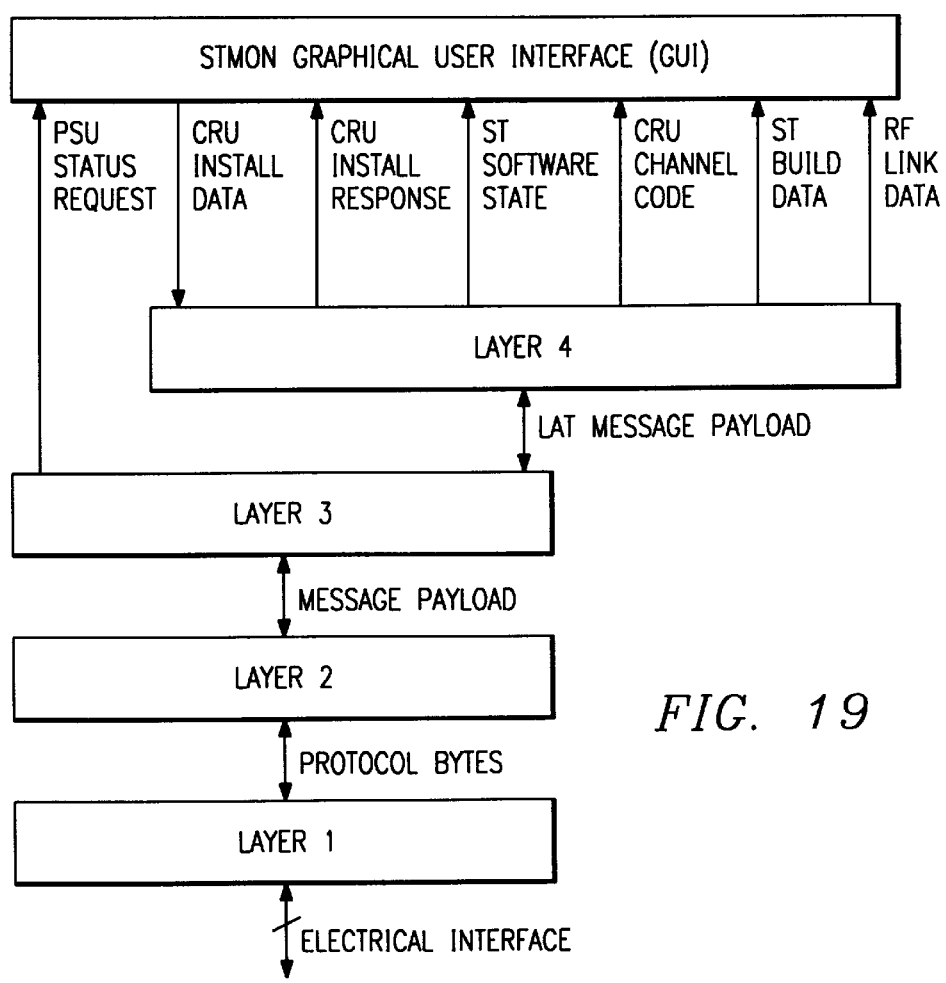
FIG. 19 illustrates a message protocol structure for the subscriber terminal monitor system.

FIG. 19 illustrates the communication protocol as implemented in the subscriber terminal monitor 550, for example by suitable programming of the microprocessor 574 and associated components, communicating via the RS232 lines 552 and 554 to the RS232 lines 544–547. It will be noted that the subscriber terminal monitor Graphical User Interface (GUI) application communicates with the RS232 link either via three protocol layers 1 to 3 or via four protocol layers 1 to 4. The basic PSU status requests instructions pass via the three protocol layers and the other messages also pass via the fourth protocol layer. The fourth protocol layer provides the interface for the messages for communicating between the subscriber terminal monitor 550 and the subscriber terminal. Selected individual messages are illustrated in FIG. 19.

The GUI application receives messages from layers 4 and 3 and interprets those messages to extract information for display and for updating internal registers. It also generates commands in response to user inputs for messages to be sent to layers 4 and 3.

The different protocol layers will now be described with reference to FIGS. 17 to 19 and also the state diagrams in FIGS. 23 to 24. In the state diagrams, the state transitions are described with the event causing a state transition indicated above the horizontal line and the resulting action indicated below the horizontal line. In the state diagrams, MA represents a management application and L1, L2, L3 and L4 represent the first, second, third and fourth protocol layers respectively.

The layer 1 protocol shown in FIGS. 17, 18 and 19 provides the basic electrical interface to the RS232 wires connecting the customer radio unit 24, the PSU 30, and when attached, the subscriber terminal monitor 550. The layer 1 protocol is based on an asynchronous serial electrical line interface under RS232 (V24) at 2400 baud with bytes of 8-bit plus 1 stop bit, no parity and no hardware handshake.

Figure 20:
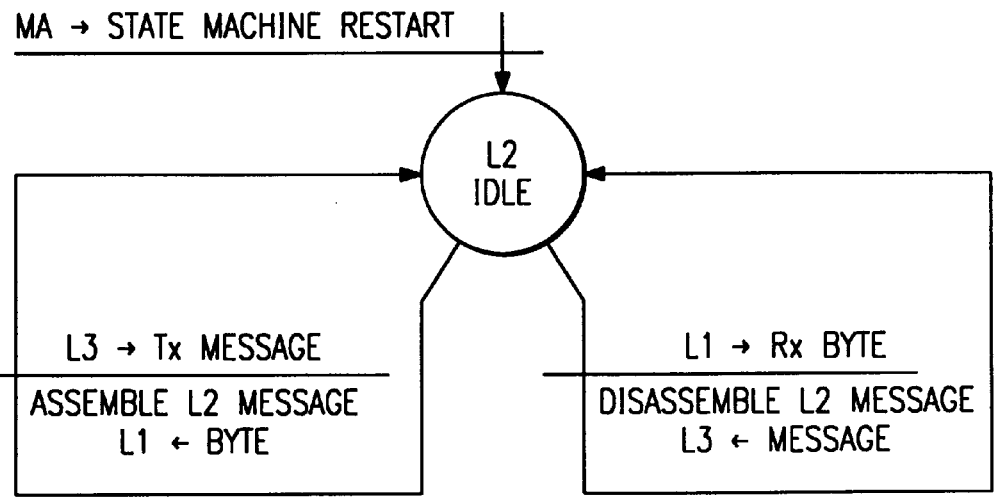
FIG. 20 is a state diagram for layer 2 of the communications protocol.

The layer 2 protocol shown in FIGS. 17, 18 and 19 and further illustrated by means of the state diagram in FIG. 20 is a simple balanced asynchronous byte-oriented packeting protocol. The message format is as follows:

| | |
|---|---|
| Byte 0 | Header Byte 1 |
| Byte 1 | Header Byte 2 |
| Byte 3 | Payload Byte 0 |
| Byte 4 | Payload Byte 1 |
| Byte N-2 | Payload Byte N-2 |
| Byte N-1 | Trailer Byte 1 |
| Byte N | Trailer Byte 2 |

The payload length is not restricted by the layer 2 protocol. The header and trailer sequences contain no sequencing or error detecting codes and no layer 2 flow control. If the payload contains data which matches either the header or trailer codes, then a unique sequence which encapsulates this data is inserted into the payload and extracted at the layer 2 part of the receive protocol.

As illustrated in FIG. 20, when the management application starts the state machine, the layer 2 state machine adopts an idle state. On receipt of a layer three message (left hand transition) a layer 2 message is assembled and individual bytes of the message are passed to layer 1 until the full message has been transmitted. On receipt of a layer 1 byte (right hand transition) the byte is added to any bytes received until a complete layer 2 message has been received, at which time a message is passed to layer 3.

Layer 3 handles the assembly of protocol messages received from the Management Application or from layer 4. Layer 3 also handles the disassembly and routing of protocol messages from layer 2 to either the management application or layer 4. The routing is based on the contents of the message type field. Four different types of message are provided for as summarised below. In the actual messages type field identifiers are included in the message type fields. However, in the table below, the numbers in the message type field are simply reference numbers for referencing the description of the messages.

In the direction field of the table below, AE indicates "Attached Equipment" (PSU 30 or STMON 550) and CR indicates the Customer Radio unit 24. In the message name field, a prefix "RCPSMSG" to each of the four message names shown below indicates that it is RLT communications power supply message.

TABLE 1

| Direction | Message Name | Type Field |
|---|---|---|
| (AE->CR) | RCPSMSG_STATUS_RES | 31 |
| (CR->AE) | RCPSMSG_STATUS_REQ | 32 |
| (AE->CR) | RCPSMSG_LAT_STATUS_REQ | 33 |
| (CR->AE) | RCPSMSG_LAT_STATUS_RES | 34 |

A description of the various messages is given below.

Message type 31 relates to a message sent by the PSU 30 in response to a RCPSMSG-STATUS-REQUEST message or on a change of the state of one of the PSU status parameters. It contains, inter alia, the following information:

Install button status—PRESSED or RELEASED
Power supply status—AC INPUT OK or AC INPUT FAILED
Battery status—BATTERY OK or BATTERY LOW
Enclosure status—LID CLOSED or LID OPEN (TAMPERED)

Message type 32 is sent periodically by the customer radio unit 24 to request PSU 30 status or to update the status LEDs 528 and 530 of the PSU 30 (and equivalent indication on the subscriber terminal monitor 550 display). It contains the following information:
CRU status—FAULTY, INITIALISING or OK
Radio link status—FAILED, OK, or CRU NOT INSTALLED Message type 33 identifies a message for carrying Layer 4 protocol messages to the customer radio unit 24.

Message type 34 identifies a messages for carrying Layer 4 protocol messages from the customer radio unit 24.

The layer 3 messages have the following format:

| | |
|---|---|
| Byte 0 | Message length (N bytes) |
| Byte 1 | Message type (coded with message type codes) |
| Byte 2 | Payload, Byte 0 |
| Byte 3 | Payload, Byte 1 |
| Byte N | Payload, Byte N-2 |

Bytes 0 & 1 form the layer 3 header. Bytes 2-N form the layer 3 payload which may comprise a full layer 4 message or it may be directly created by the management application.

Figure 21:
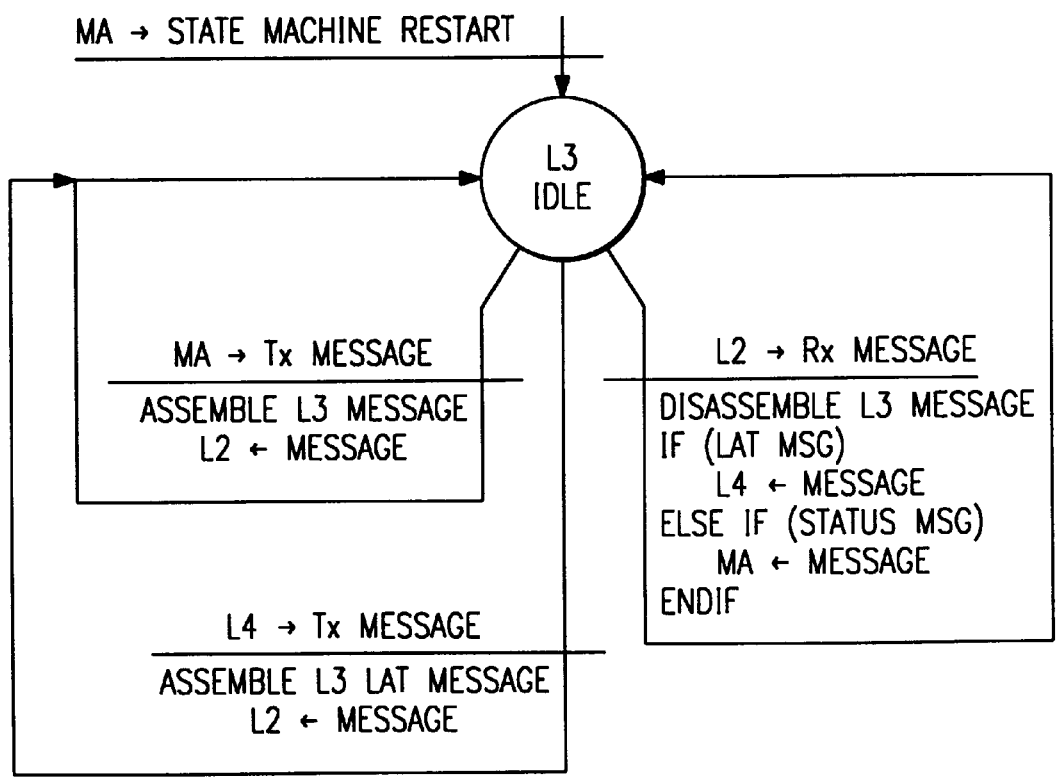
FIG. 21 is a state diagram for layer 3 of the communications protocol.

As illustrated in FIG. 21, when the management application starts the state machine, the layer 3 state machine adopts an idle state. On receipt of a management application message (inner left hand transition), a layer 3 message is assembled and passed to layer 2. When a layer 4 message is received (outer left hand transition) a layer 3 LAT message is assembled and passed to layer 2. The LAT messages are special messages provided for communication with the subscriber terminal monitor 550. When a layer 2 message is received (right hand transition) it is disassembled to an L3 message. If it is found to be a LAT message, then it is passed to layer 4, otherwise it is passed to the management application.

Layer 4 controls the protocol functions associated with support of the subscriber terminal monitor 550. Under control from the customer radio unit management application (MA), the customer radio unit layer 4 regularly sends status information for display at the display of the subscriber terminal monitor 550. In the preferred embodiment, layer 4 terminates a predetermined time after being initialised. However, as will be described later, it can be opened and closed again if required by predetermined messages. Layer 4 also handles parts of the protocol to enable a subscriber terminal install procedure to be carried out under the control of the subscriber terminal monitor 550, either using a standard telephone or the subscriber terminal monitor itself.

Examples of message which can be sent in accordance with the layer 4 protocol are set out in Table 2 below. The same format is used as for Table 1, with the numbers in the message type field being simply reference numbers for referencing the description of the messages.

TABLE 2

| Direction Field | Message name (optional) Type | |
|---|---|---|
| (CR->AE) | LAT_RESPONSE_TEXT | 40 |
| (CR->AE) | LAT_RES_VERSION | 41 |
| (CR->AE) | LAT_RES_STATUS_MSG | 42 |
| (CR->AE) | LAT_RES_MODEM_DATA | 43 |
| (CR->AE) | LAT_RES_RF_DATA | 44 |
| (CR->AE) | LAT_RES_DOWNLINK_BER_DATA | 45 |
| (CR->AE) | LAT_RES_UPLINK_BER_DATA | 46 |
| (AE->CR) | LAT_COMMAND_STMON_STATE | 47 |
| (AE->CR) | LAT_COMMAND_STMON_REBOOT | 48 |
| (AE->CR) | LAT_COMMAND_STMON_INSTALL | 49 |
| (CR->AE) | LAT_RESPONSE_STMON_INSTALL | 50 |
| (AE->CR) | LAT_COMMAND_STMON_INSTALL_DATA | 51 |

Message type 40 is a general text message output from the customer radio unit. This allows the customer radio unit to output test/debug messages to a terminal for decoding the LAT protocol.

Message type 41 gives the subscriber terminal software version number. This is output on restart and is displayed by the subscriber terminal monitor 550.

Message type 42 is a subscriber terminal status message and includes status parameters for the radio link lock state, overhead management channel lock state, subscriber terminal software state and AGC & power control states. It is output by the customer radio unit 24 at regular intervals. This information is disassembled and displayed by the subscriber terminal monitor 550.

Message type 43 gives the CRU channel data (CDMA R/W and PN codes). It is output by the customer radio unit 24 on restart and is disassembled and displayed by the subscriber terminal monitor 550.

Message type 44 gives the CRU RF channel numbers (uplink and downlink RF channels codes). It is output on restart and is displayed by the subscriber terminal monitor 550.

Message type 45 gives the downlink radio soft error count, and downlink rate (10 k or 160 kb/s). This is output by the customer radio unit at regular intervals and is displayed by the subscriber terminal monitor 550.

Message type 46 gives the uplink radio soft error count, and uplink rate (10 k or 160 kb/s). This is output by the customer radio unit at regular intervals and is displayed by the subscriber terminal monitor 550.

Message type 47 contains STMON 'Open/Close' commands. 'Open' is sent by the subscriber terminal monitor 550 to restart the layer 4 protocol. This causes the customer radio unit 24 to output all messages that are associated with restart. 'Close' is used to stop the customer radio unit sending layer 4 protocol messages.

Message type 48 requests that the customer radio unit microcontroller 276 re-boots.

Message type 49 invokes the subscriber terminal monitor install procedure. The subscriber terminal monitor then looks for install digits to be sent from the AE. When the customer radio unit 24 has received all the digits or after a predetermined time (e.g., one minute), the customer radio unit microcontroller evaluates the install digits and outputs an appropriately coded LAT_RES_STMON_INSTALL message.

Message type 50 reports the subscriber terminal monitor install status, either Installed OK (success), Install failed (failure) or Install ready to proceed (CRU is waiting for more digits).

Message type 51 is used to transport each individual install digit to the customer radio unit during the installation procedure.

Other message types can be employed for passing other information, for example build status information, if required.

The layer 4 messages have the following format:
Byte 0 LAT MESSAGE TYPE (coded with message type codes)

| Byte | 1 | Payload | 1 |
|------|---|---------|---|
| Byte | 2 | Payload | 2 |
| Byte | 3 | Payload | 3 |

Figure 22:
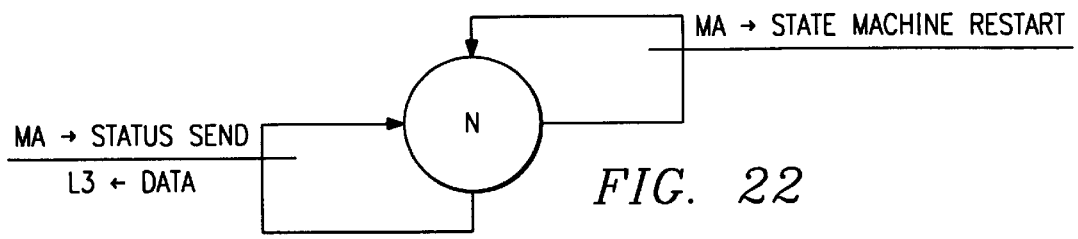
FIG. 22 is a state diagram for layer 4 of the communications protocol.

As illustrated in FIG. 22, when the management application sends a status message (left hand transition), the status message is passed to the layer 3. This is done in sequence for different status parameters. When the management application restarts the status message, the state machine starts again with the first status parameter of the sequence.

By interfacing with the system status parameters on the RS232 link on the drop cable 28, the subscriber terminal monitor 550 is able to display selected status information relating to the subscriber terminal equipment and the radio link. The subscriber terminal monitor system also provides the facilities to program a Channel Code into a subscriber terminal in the absence of a suitably equipped subscriber terminal Power Supply. The subscriber terminal monitor system further provides the facility to log captured data to a file.

As mentioned above, the display of the subscribers terminal monitor system is provided with different display fields. In the present embodiment five fields are provided as described below:

Field 1—Uplink Radio Performance
  The following status information is displayed:
  Uplink radio status (No link, OK)
  Uplink power control level
Field 2—Downlink Radio Performance
  The following status information is displayed;
  Downlink radio status (No link, OK)
  Downlink AGC level
  Downlink rate (High or Low rate)
  Downlink soft error count as a per second count
Field 3—Subscriber Terminal Status
  The following status information is displayed;
  Subscriber terminal internal software state code
  Subscriber terminal alarm (initialising, faulty)
Field 4—Subscriber Terminal Monitor System Status
  The following status information will be displayed:
  Subscriber terminal monitor system communications status (Com port name and current status)
  Subscriber terminal monitor system Log File Size in bytes
Field 5—Subscriber Terminal Build Status
  Various build-status information can be displayed including:
  Subscriber terminal channel code (RF, PN and R/W codes)
  Subscriber terminal microcontroller 276 software version number
  Subscriber terminal serial numbers
Field 6—Data field
  This displays data input by the user in an installation mode It will be understood that other combinations of fields and/or status information may be displayed. Also, rather than displaying all of the fields and/or data at one time, different items of data may be displayed. Also, windowing techniques could be used for displaying different fields in different windows on the display screen.

The subscriber terminal monitor system could also be implemented on other processing devices, for example a device with a small display which would not be able to display all the parameters at once, in which case windowing or display switching techniques could be used.

The subscriber terminal monitor system also provides a facility for conducting the installation processes necessary at the initial installation of the subscriber terminal, or when changes in the system installation or configuration are required.

The subscriber terminal monitor system can be configured such that a single keypress on the keyboard 814 (e.g. a specific function key) or mouse 816 or other single operation can invoke a install mode of operation of the subscriber terminal. Installation procedures can then be performed using a normal telephone connected to Line 1 or Line 2 as described below:

In order to be able to operate, the customer radio unit 24 needs to be programmed with the frequency, pseudo-random noise code, and CDMA code corresponding to the central terminal 10 associated with the programmable subscriber terminal 20.

For normal installation, the customer radio unit 24 will be physically installed at a customer premises and wired down to the power supply unit 30 and the network termination unit 32. The network termination unit 32 is coupled to one or more subscriber telephone sets 34, facsimile machines 34, and personal computers 36 as required (see FIG. 2). Then the installation programming of the customer radio unit 24 begins by making the appropriate keypress. Instructions to this effect can be displayed, or controlled, for example using menus or prompts on the display 810. Once the installation mode has been activated, the handset of a subscriber telephone set 34 can be lifted off-hook and a continuous tone is generated indicating that it is safe to proceed with programming. Programming is performed by entering digits through subscriber telephone set 34, either verbally or through use of push-buttons 198. Alternatively, programming may be performed through the personal computer 38 with responsive indications provided to the personal computer 38.

Preferably, a programming code having twelve digits is entered into the customer radio unit 24 through the subscriber telephone set 32. The programming code is made up of a frequency field, a pseudo-random noise code field, a CDMA code field, a network identifier field, and a check digit field. The frequency field is a two digit field specifying one possible operating frequency for the subscriber terminal 20 corresponding to the central terminal 10. The pseudo-random noise code field is a one digit field specifying the proper pseudo-random noise code for transmissions between the subscriber terminal 20 and the central terminal 10. The CDMA code field is a two digit field specifying the proper CDMA code for transmissions between the subscriber terminal 20 and the central terminal 10. These three fields comprise the channel code used to define which channel the subscriber terminal 20 is allowed to receive and transmit on. The network identifier field is a six digit field specifying the identity of subscriber terminal 20 for central terminal 10. The check digit field is a one digit field specifying a validation of each field in the programming digit code.

The programming code may be entered in the order described above or in a specified scrambled order. Although a specific length has been described for each field, the programming code may have different length fields and any number of fields depending on the design choices selected. A timer may also be implemented to establish a timed interval within which the programming code should be entered. Upon successfully entering the programming code, the customer radio unit 245 generates a tone signal having periodic intervals encoded therein to the subscriber telephone set 34 indicating successful programming of the customer radio unit 24. Programming for subscriber terminal 20 takes effect upon placing the handset of subscriber telephone set 34 in the on-hook condition.

Successful completion of the initialisation programming operations is displayed on the display screen 810 of the subscriber terminal monitor system 420.

Likewise, unsuccessful initialisation programming of the subscriber terminal programming is displayed on the display 810 of the subscriber terminal monitor system. In the event that programming is unsuccessful, the customer radio unit 24 can also be arranged to generate a tone signal having rapid intervals encoded therein to the subscriber telephone set 34 indicating that programming of customer radio unit 24 has not taken place. Unsuccessful programming of the customer radio unit 24 may occur if the programming code is not entered within the timed interval, an invalid digit is entered, check digit validation fails, or if any of the fields is detected as being out of range. The programming of the customer radio unit 24 does not take effect if any of the above conditions occur.

Once programming is completed, normal operation of the subscriber terminal may be effected.

Preferably, subsequent to the first initialisation of the subscriber terminal, a bypass code is require to enable a new initialisation in order to avoid unauthorised tampering with the installation programming.

As an alternative to using a telephone 34 for the initialisation programming, this may be performed using the subscriber terminal monitor system or using a separate 'edit box' allowing the user to enter and edit a string of digits as would normally be entered using a telephone 34. Valid digits comprise '0' to '9', '*' and '#'.

Figure 23:
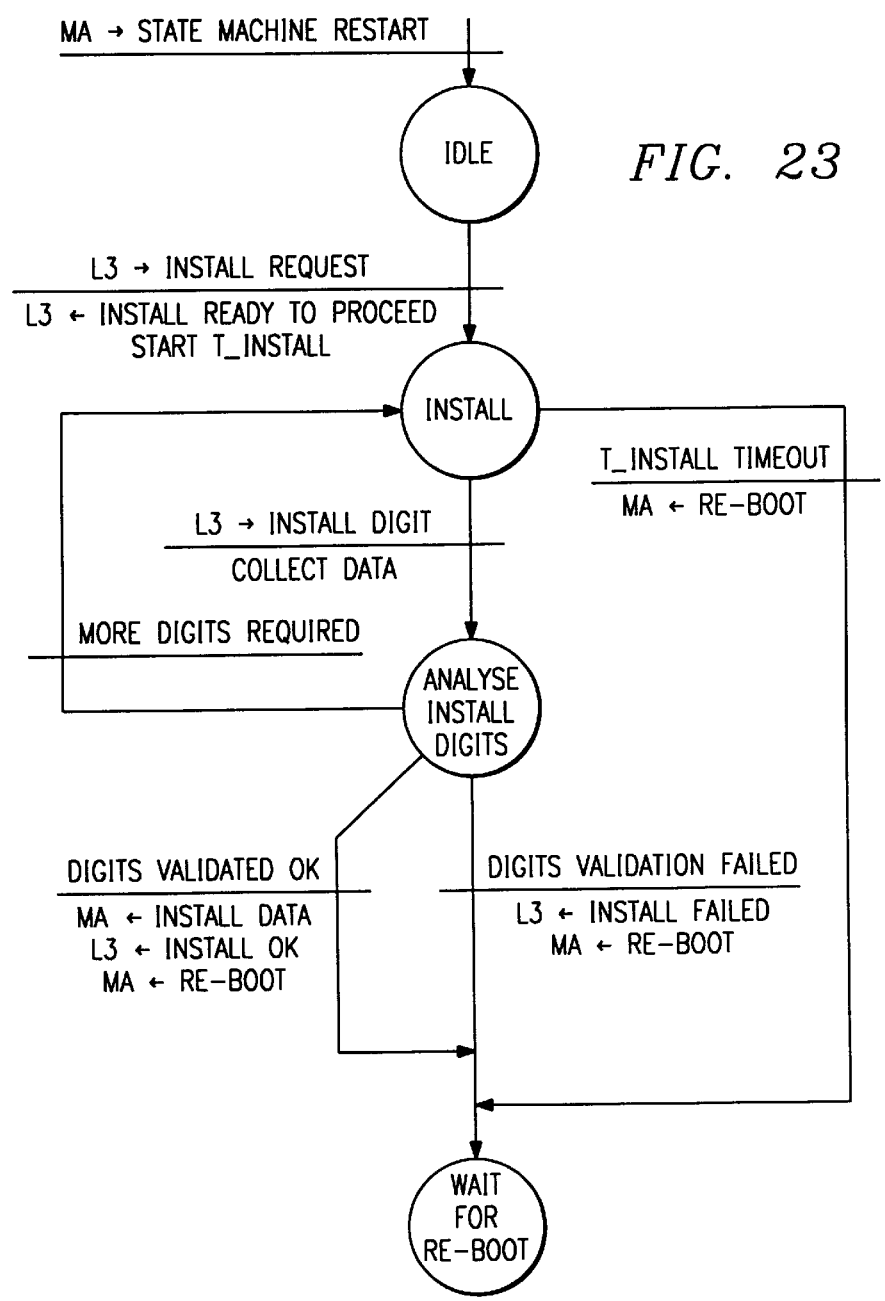
FIG. 23 is a state diagram for a layer 4 install function of the subscriber terminal monitor system.

FIG. 23 is a state diagram to illustrate the control of the install functions by the layer 4 state machine of the subscriber terminal monitor 550.

When the management application restarts the state machine, the state machine moves to an Idle state.

When a layer 3 install request is received, an Install Ready to Receive message is sent to layer 3 and the T_install timer is started. In the Install state, if a layer 3 install digit message is received, data is collected (vertical transition to state Analyse Install Digit).

In the Analyse Install Digit state, if more digits are required, the state machine reverts to the install state.

Alternatively, if the digits are validated OK (left hand transition) the install data are passed to the management application, an install OK message is passed to layer and a reboot message is passed to the management application.

In the Install state, if a layer 3 install timeout message is received (right hand transition) a re-boot message is passed to the management application.

In the Analyse Install Digit state, if the digits validation fails (middle transition), an install failed message is passed to layer 3 and a re-boot message is passed to the management application.

Following the sending of a re-boot message to layer 3, the state machine waits for re-boot.

The functions provided by the state machine allow the installation of the subscriber terminal to be performed using the subscriber terminal monitor 550.

The subscriber terminal monitor system is also arranged to permit logging of selected system parameters. The logging may be initiated using, for example, a menu or a command line option. Either way, the user is required to specify the name of a log file, which is then created by the subscriber terminal monitor system. In one embodiment one or more of the following information is logged in response to the user selection of this function:

Date

Time

Number of seconds elapsed since subscriber terminal monitor system was started

Downlink Status

Uplink Status

Downlink AGC level

Uplink Power Control level

Downlink Soft Error Count

Downlink Data Rate

Subscriber terminal Software State Code

Subscriber Terminal Monitor System Comms Status

It will be appreciated that other combinations of information may be logged as required.

Although a particular embodiment has been described herein, it will be appreciated that the invention is not limited

What is claimed is:

1. A subscriber terminal of a wireless telecommunications system, which subscriber terminal comprises:
   a transmitter/receiver unit for wireless communication with a central station, said transmitter/receiver unit including a communications controller for processing signals for transmission and/or received signals;
   a terminal unit for connection to one or more telephone lines for user telecommunications equipment; and
   a link connecting said communications controller of said transmitter/receiver unit to said terminal unit, wherein said link carries subscriber terminal control data in accordance with a multilayer internal protocol, said multilayer internal protocol comprises a first message type for passing control data between said communications controller and said terminal unit and a second message type for passing control data to a subscriber terminal monitor system connectable to said link in order to not affect normal operation of the subscriber terminal, wherein said communications controller comprises a protocol conversion structure having a predetermined protocol layer for assembling and disassembling messages of said second type and at least one lower protocol layer for identifying messages of said second type and passing said messages of said second type to said predetermined protocol layer to be processed and for causing messages of said first type to bypass said predetermined protocol layer.

2. A subscriber terminal according to claim 1, wherein said predetermined protocol layer can be selectively switched in and out.

3. A subscriber terminal according to claim 1, wherein said predetermined protocol layer is configured automatically to switch out a predetermined time after being initialized.

4. A subscriber terminal according to claim 1, wherein said terminal unit comprises a protocol conversion structure without said predetermined protocol layer, said lower layer blocking messages of said second type at said terminal unit.

5. A subscriber terminal according to claim 1, wherein said communications controller and/or said terminal unit comprise one or more registers for control data.

6. A subscriber terminal according to claim 1, wherein said link is an RS232 link.

7. A subscriber terminal according to claim 1, wherein said link is a multi-wire cable.

8. A subscriber terminal according to claim 1, wherein said transmitter/receiver unit, including an aerial arrangement, is contained in a housing configured for mounting at a raised location for wireless communication with a remote central station.

9. A subscriber terminal according to claim 8, wherein said terminal unit comprises an alternating current power supply unit and is connected to said communications controller via a drop cable, which forms said link.

10. A subscriber terminal according to claim 1, wherein said control data include one or more of the following:
    the status of a wireless uplink from the subscriber terminal to a central station;
    the status of a wireless downlink from the subscriber terminal to a central station;
    uplink power control level;
    downlink automatic gain control settings;
    downlink transmission rate;
    downlink error rate;
    software status codes; and
    subscriber terminal alarm status.

11. A subscriber terminal according to claim 1, wherein said control data include one or more of the following:
    subscriber terminal wireless transmission and reception codes;
    subscriber terminal equipment identifiers; and
    subscriber terminal serial numbers.

12. A subscriber terminal according to claim 1, wherein said control data include an installation enable status code.

13. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein a predetermined protocol layer is provided for assembling and disassembling messages of said second type, wherein said predetermined protocol layer can be selectively switched in and out.

14. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein a predetermined protocol layer is provided for assembling and disassembling messages of said second type, wherein said terminal unit comprises a protocol conversion structure without said predetermined protocol layer, said lower layer blocking messages of said second type at said terminal unit.

15. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein said communications controller and/or said terminal unit comprise one or more registers for control data.

16. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein said transmitter/receiver, including an aerial arrangement, is contained in a housing configured for mounting at a raised location for wireless communication with a remote central station.

17. A subscriber terminal according to claim 16, wherein said terminal unit comprises an alternating current power terminal unit and is connected to said communications controller via a drop cable, which forms said link.

18. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein said control data include one or more of the following:

the status of a wireless uplink from the subscriber terminal to a central station;

the status of a wireless downlink from the subscriber terminal to a central station;

uplink power control level;

downlink automatic gain control settings;

downlink transmission rate;

downlink error rate;

software status codes; and subscriber terminal alarm status.

19. A subscriber terminal of a wireless telecommunications system, which subscriber terminal comprises a transmitter/receiver for wireless communication with a central station, a communications controller for processing signals for transmission and/or received signals, a terminal unit for connection to one or more telephone lines for user telecommunications equipment, and a link connecting said communications controller to said terminal unit, wherein said link carries subscriber terminal control data in accordance with an internal protocol, said internal protocol comprises a first message type for passing control data between said communications controller and said terminal unit and a second message type for passing control data to a subscriber terminal monitor system, wherein said control data include one or more of the following:

subscriber terminal wireless transmission and reception codes;

subscriber terminal equipment identifiers; and subscriber terminal serial numbers.

\* \* \* \* \*